US008873872B1

(12) United States Patent
Ostiguy et al.

(10) Patent No.: US 8,873,872 B1
(45) Date of Patent: Oct. 28, 2014

(54) DIVISION OF ENTROPY CODING IN CODECS

(71) Applicant: Matrox Graphics Inc., Dorval (CA)

(72) Inventors: Jean-Jacques Ostiguy, Montreal (CA);
Simon Garneau, Coteau-du-Lac (CA);
Oui Goi, Montreal (CA)

(73) Assignee: Matrox Graphics Inc., Dorval, Quebec (CA)

( * ) Notice: Subject to any disclaimer, the term of this patent is extended or adjusted under 35 U.S.C. 154(b) by 217 days.

(21) Appl. No.: 13/622,785

(22) Filed: Sep. 19, 2012

Related U.S. Application Data

(60) Provisional application No. 61/625,995, filed on Apr. 18, 2012.

(51) Int. Cl.
*G06K 9/36* (2006.01)
*G06K 9/46* (2006.01)

(52) U.S. Cl.
USPC ............................. 382/232; 382/233; 382/244

(58) Field of Classification Search
USPC ......... 382/232, 233, 238, 240, 244, 246, 247, 382/248
See application file for complete search history.

(56) References Cited

U.S. PATENT DOCUMENTS

| 7,551,789 B2 * | 6/2009 | Tu et al. ........................ 382/248 |
| 7,916,960 B2 * | 3/2011 | Mizuno ......................... 382/240 |
| 8,401,082 B2 * | 3/2013 | Ye et al. ..................... 375/240.23 |

* cited by examiner

*Primary Examiner* — Phuoc Tran
(74) *Attorney, Agent, or Firm* — Norton Rose Fulbright Canada LLP

(57) ABSTRACT

There is described an image compressing/decompressing method and device that provides the lossless data compression/decompression scheme in two separate modules. Partially entropy encoded/decoded data is written to memory by a first module after a first part of the process and retrieved by a second module to perform the second part of the lossless compression/decompression scheme.

19 Claims, 20 Drawing Sheets

DIVISION OF ENTROPY CODING IN CODECS

CROSS-REFERENCE TO RELATED APPLICATIONS

The present application claims priority under 35 U.S.C. §119(e) of U.S. Provisional Patent Application No. 61/625,995 filed on Apr. 18, 2012, the contents of which are hereby incorporated by reference.

TECHNICAL FIELD

The present invention relates to the field of image data compression and decompression.

BACKGROUND OF THE ART

Applications that use image data are found in many different fields, such as security control, television, broadcasting, social media, video telephony, videoconferencing, wireless devices, streaming media applications, remote desktop, cloud computing, and others. Image data may refer to video data, computer generated graphics data, desktop data, or any other type of data depicting a visual perception. Image data may be stored in a variety of medium (DVDs, Blu-Ray disks, mobile devices, memory sticks, hard-drive, etc) and may be transmitted through a variety of medium such as fiber optics, IP connections, USB, satellite, etc.

Image compression and decompression are performed to reduce the consumption of expensive resources, such as storage space or transmission bandwidth. In general, a codec (encoder/decoder) includes an encoder used to convert the source data into a compressed form occupying a reduced space prior to storage or transmission. The codec may also comprise a decoder which receives compressed data and converts it into a decompressed image or stream ready for display or for further processing. The codec may be a software implementation, a hardware implementation, or a combination thereof.

Two types of encoding exist, namely lossy and lossless. An encoder is lossless if the data once decoded is the exact copy of the source data. An encoder is lossy if the decoded data is not the exact copy of the source data. In general, encoders are made to be lossy due to the limits to the amount of compression that can be obtained with lossless compression techniques. However, in lossy encoders, the two goals of achieving better quality and compression efficiency are usually conflicting. Image data compression is usually a tradeoff between storage space, image quality, and the cost of hardware required to decompress the image data in a reasonable time.

In some instances, encoders/decoders will provide a combination of lossy and lossless compression/decompression schemes. There are some challenges in providing both lossy and lossless compression schemes in a single codec such that storage space, image quality, frequency of operation, and costs are all optimized.

When performing advanced video coding, syntax elements generated after the transformation and quantization steps are encoded to form a bit stream using variable length coding and/or arithmetic coding. Arithmetic coding, in particular, requires intensive computation and therefore, there is a need for optimizing the resources, such as bandwidth and memory footprint, as well as a need to improve the general performance of the codec.

SUMMARY

There is described an image compressing/decompressing method and device that provides the lossless data compression/decompression scheme in two separate modules. Partially entropy encoded/decoded data is written to memory by a first module after a first part of the process and retrieved by a second module to perform the second part of the lossless compression/decompression scheme. The architecture and method are applicable with several video compression standards, such as H.264, MPEG-4, and Motion JPEG 2000.

In accordance with a first broad aspect, there is provided a method for compressing a data stream with a compression device comprising at least a first module and a second module. The method comprises processing the data stream using a lossy compression scheme to generate a set of reconstruction parameters and transform coefficients. The transform coefficients are reordered in the first module and a first set of lossless encoding schemes are applied to a first portion of the reconstruction parameters and the transform coefficients in the first module. A selection of which ones of the reconstruction parameters and the transform coefficients will form part of a compressed bit stream is performed in the first module and the selected ones of the reconstruction parameters and transform coefficients are written to memory. The second module then retrieves from memory the selected ones of the reconstruction parameters and transform coefficients and applies a second set of lossless encoding schemes to a second portion of the reconstruction parameters and transform coefficients, and the compressed bit stream is generated.

In accordance with another broad aspect, there is provided a compression device for compressing a data stream. The device comprises at least a first module configured for processing the data stream using a lossy compression scheme to generate a set of reconstruction parameters and transform coefficients, reordering the transform coefficients, applying a first set of lossless encoding schemes to a first portion of the reconstruction parameters and the transform coefficients, selecting which ones of the reconstruction parameters and the transform coefficients will form part of a compressed bit stream, and writing to memory selected ones of the reconstruction parameters and transform coefficients. A second module separate from the first module is configured for retrieving from the memory the selected ones of the reconstruction parameters and transform coefficients, applying a second set of lossless encoding schemes to a second portion of the reconstruction parameters and transform coefficients, and generating the compressed bit stream.

In accordance with another broad aspect, there is provided a method for decompressing a data stream with a decompression device having at least a first module and a second module. The first module is used for receiving a compressed bit stream, applying a first set of lossless decoding schemes to the compressed bit stream to produce a first set of reconstruction parameters and transform coefficients, and writing to memory the first set of reconstruction parameters and transform coefficients and a remaining portion of the compressed bit stream. The second module is used for retrieving from memory the first set of reconstruction parameters and transform coefficients and the remaining portion of the compressed bit stream, applying a second set of lossless decoding schemes to the bit stream to recover a second set of reconstruction parameters and transform coefficients, and processing the data stream using a lossy decompression scheme to recover the data stream as decompressed.

In accordance with yet another broad aspect, there is provided a decompression device for decompressing a data stream. The device comprises a first module configured for receiving a compressed bit stream, applying a first set of lossless decoding schemes to the compressed bit stream to produce a first set of reconstruction parameters and transform coefficients, and writing to memory the first set of reconstruction parameters and transform coefficients and a remaining portion of the compressed bit stream. The device also comprises at least a second module configured for retrieving from memory the first set of reconstruction parameters and transform coefficients and the remaining portion of the compressed bit stream, applying a second set of lossless decoding schemes to the bit stream to recover a second set of reconstruction parameters and transform coefficients, and processing the data stream using a lossy decompression scheme to recover the data stream as decompressed.

In some embodiments of the method for decompressing and the decompressing device, applying a first set of lossless decoding schemes comprises applying arithmetic decoding to the compressed bit stream. In some embodiments, the arithmetic decoding is part of CABAC.

In some embodiments of the method for decompressing and the decompressing device, applying a first set of lossless decoding schemes comprises encoding the transform coefficients with a variable length encoding scheme. In some embodiments, the variable length encoding scheme is defined according to a CABAC compression scheme. In some embodiments, applying a second set of lossless decoding schemes comprises inversing the variable length encoding performed on the transform coefficients. In some embodiments, inversing the variable length encoding scheme on the transform coefficients is defined according to a CABAC decompression scheme. In some embodiments, applying a first set of lossless encoding schemes comprises performing context-adaptive variable length coding (CAVLC) on the transform coefficients.

In this specification, the term "macroblock" is intended to mean a partition of a picture representing image data. For example, a macroblock may correspond to a 16×16 sample region of a picture (16×16 luma samples, 8×8 Cb and 8×8 Cr samples). Other partitionings will be readily understood by those skilled in the art. A picture may comprise one or more slices, each containing an integral number of macroblocks from 1 to the total number of macroblocks in the picture (1 slice per picture). The number of macroblocks per slice need not be constant within a picture.

BRIEF DESCRIPTION OF THE DRAWINGS

Further features and advantages of the present invention will become apparent from the following detailed description, taken in combination with the appended drawings, in which:

FIG. 2b is a flowchart of an exemplary method for compressing image data using the codec of FIG. 2a;

FIG. 3 is a block diagram of an exemplary prediction module of the codec of FIG. 2a;

FIG. 4 is a block diagram of an exemplary transformation module of the codec of FIG. 2a;

FIG. 9 is a flowchart of an exemplary method for decompressing image data using the codec of FIG. 2a;

It will be noted that throughout the appended drawings, like features are identified by like reference numerals.

DETAILED DESCRIPTION

Figure 1:
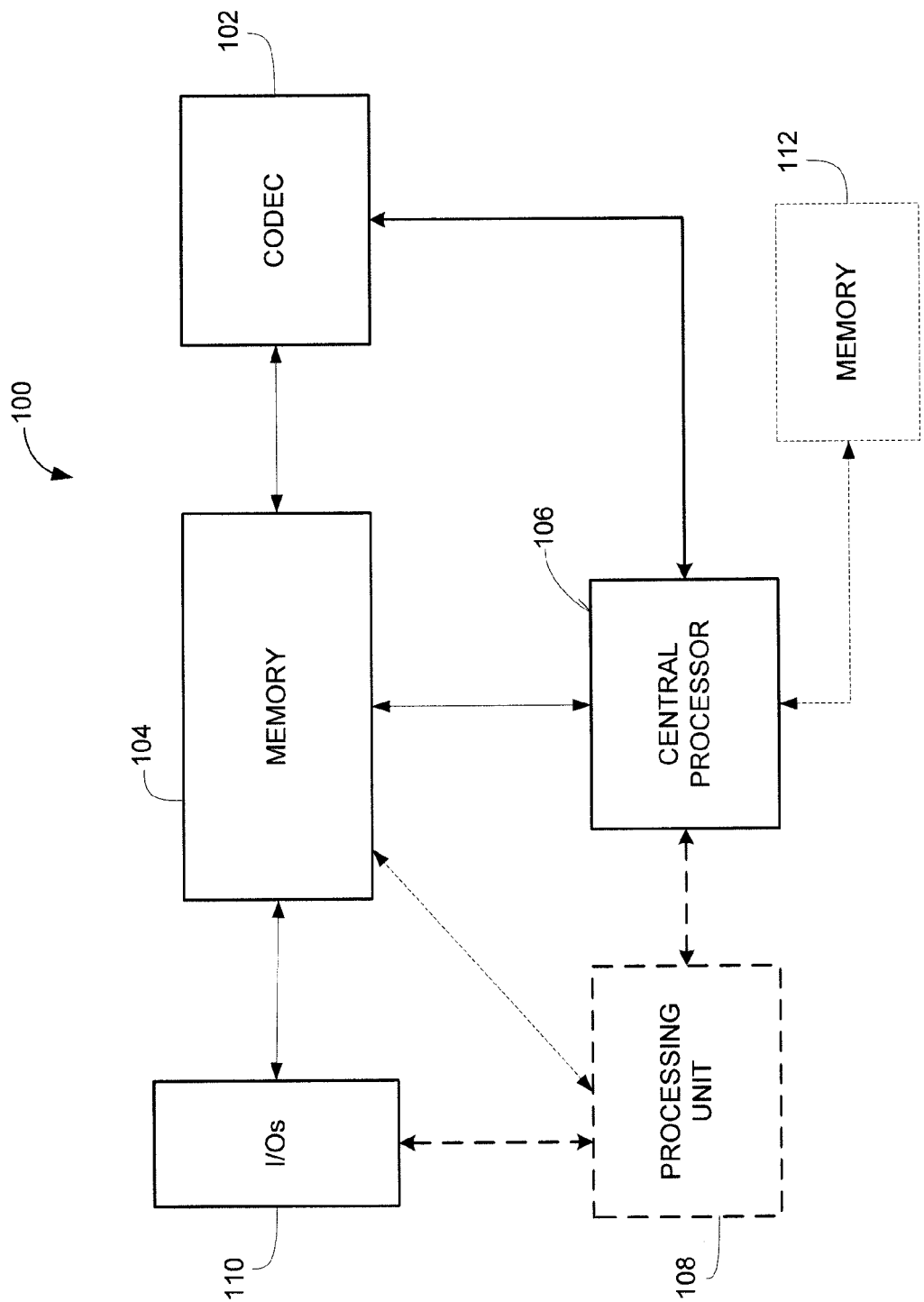
FIG. 1 is a block diagram of an exemplary system comprising a codec.

FIG. 1 illustrates a system 100 comprising a codec 102, a memory 104, and a central processor 106. The memory 104 accessible by the central processor 106 receives and stores data. The memory 104 may be a main memory of the central processor 106, such as a high speed Random Access Memory (RAM), or a local memory. The central processor 106 may access the memory 104 to retrieve data.

In some embodiments, the system 100 may also comprise one or more processing unit 108 connected to the memory 104. This additional processing unit 108 may correspond to a graphics processing unit, a video processing unit, a display engine, an audio processor, or any other type of processing unit known to those skilled in the art. A plurality of input/output interfaces 110 may also be provided to allow the system 100 to receive and transmit data from/to external modules and/or peripheral devices. Also illustrated in FIG. 1 is a second memory 112 connected to the central processor 106.

The components of the system 100 may be packaged in various manners. For example, the central processor 106 and the codec 102 may be included in a System-on-a-chip (SoC). The codec 102 may be included in a chip while the central processor 106 is provided externally to the chip. The memory 104 and the codec 102 may be provided in an SoC or a chip. The codec 102 may be included in an integrated circuit or a chip and the memory 104 may be external to the integrated circuit. The codec 102, the central processor 106, the processing unit 108 and the Input/Output interfaces 110 may be connected to the memory 104 through a memory controller (not shown). The codec 102 may also be located remotely from the central processor 106 with the two components being part of a network.

The image data to be compressed/decompressed may be stored in memory 104, memory 112 or any other memory operatively connected to codec 102, directly or indirectly. If the image data is stored externally to the system 100, it may be copied into memory 104 or memory 112 before processing, by the codec 102 or by a dedicated module, such as a copy engine (not shown). The image data may correspond to a stream of pictures, a picture, and/or a portion of a picture. A picture may be a frame or a field. In some embodiments, a portion of a picture may correspond to one or more macroblocks. For example, a portion of a picture may be a slice.

The codec 102 may use one or more of a number of previously encoded pictures as a reference for motion-compensated prediction of each inter coded macroblock or macroblock partition. This enables the codec 102 to search for the best match for the current macroblock partition from a wider set of pictures than just the previously encoded picture. The codec may thus maintain one or more lists of reference pictures, containing pictures that have previously been encoded and decoded (occurring before and/or after the current picture in display order).

Figure 2A:
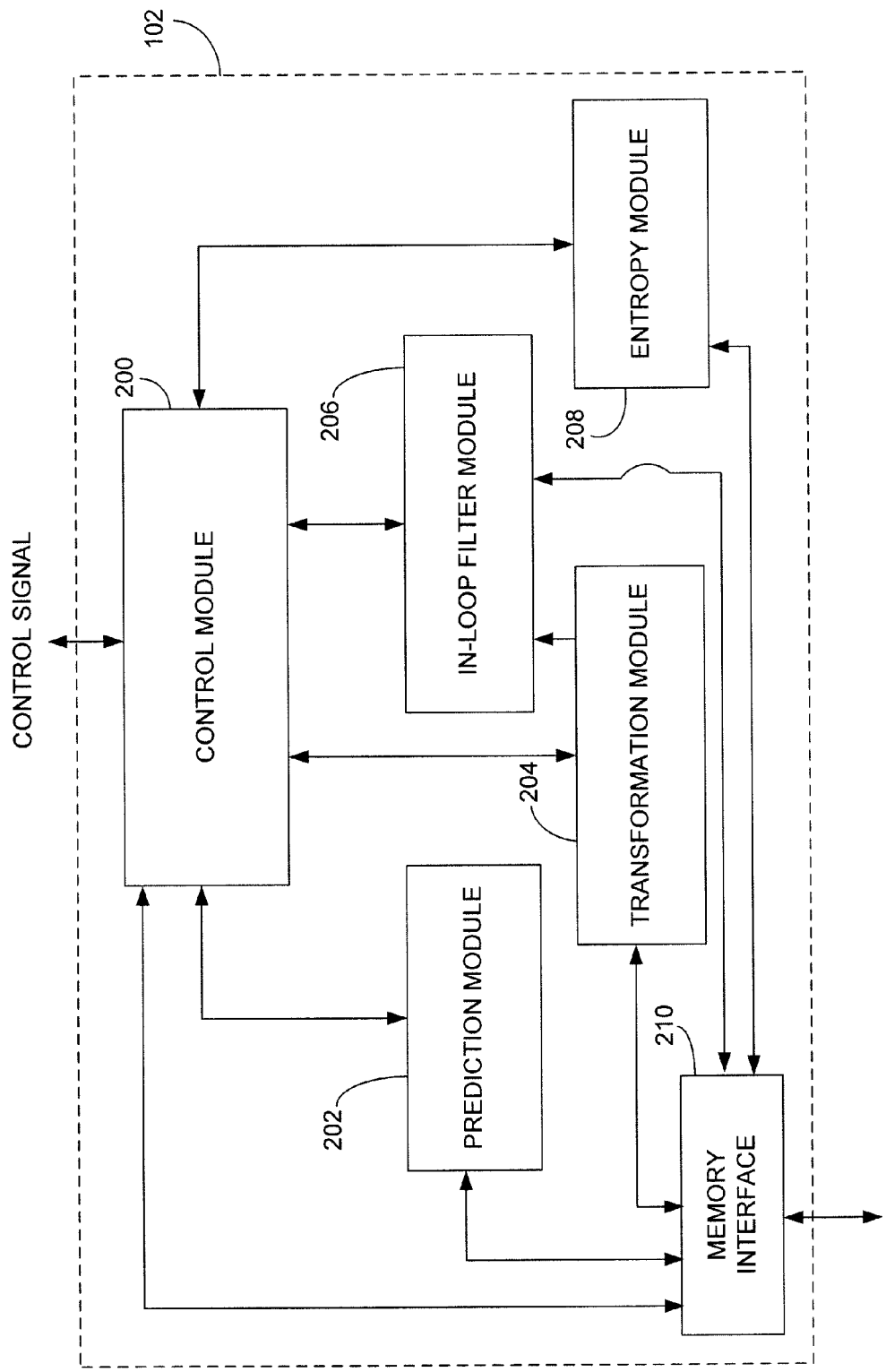
FIG. 2a is a block diagram of an exemplary codec for compressing and/or decompressing image data.

FIG. 2a is a block diagram of an exemplary embodiment of the codec 102 for encoding an uncompressed bit stream into a compressed bit stream and/or for decoding a compressed bit stream into an uncompressed bit stream. In this embodiment, a control module 200 acts as an initial input point for the codec 102. A control signal may be received by the control module 200 in order to trigger compression and/or decompression of the image data. The control signal may be generated by an application running on central processor 106, processing unit 108, or another processing unit operatively connected to codec 102, directly or indirectly. The application may request that an entire stream of pictures, a portion of a stream of pictures, a picture, or a portion of a picture be compressed and/or decompressed. In some embodiments, the request for compression and/or decompression may be broken down into a plurality of requests for compressing/decompressing portions of the stream. The plurality of requests may comprise one or more steps for configuring the codec 102 according to the application's initial request.

The control signal may comprise control information to allow the control module 200 to configure the various modules of the codec 102 with appropriate parameters in order to perform the requested task(s) of compressing/decompressing image data. Configuration may be performed in one or more steps, depending on the initial request and on the format of the request. Compression/decompression parameters such as picture resolution, output bit rate, picture type and coding functions may be provided to the control module 200 together with the request for compression/decompression or separately therefrom. Depending on the task, some of the modules may not need to be configured and may not be used to process data.

A prediction module 202, transformation module 204, in-loop filter module 206 and entropy module 208 are each connected to a memory interface 210 in order to read and write data to memory 104 without passing through the control module 200. In the embodiment illustrated, the memory interface 210 is internal to the codec 102 while the memory 104 is external to the codec 102. In an alternative embodiment, both the memory interface 210 and the memory 104 are external to the codec 102. The prediction module 202 and the transformation module 204 may be connected together in order to pass information directly therebetween. The transformation module 204 may also be connected directly to the in-loop filter module 206. The prediction module 202, transformation module 204, in-loop filter module 206 and entropy module 208 are each connected to the control module 200 for configuration and control of the process.

In one embodiment, the codec 102 is configured to compress image data. In general, image data is stored in the memory 104 and requests are sent to the codec 102 to compress the image data. Following the receipt of the compression requests, the control module 200 of the codec 102 configures the prediction module 202 with appropriate parameters for processing the image data stored in memory 104. The prediction module 202 accesses the memory 104 through the memory interface 210, processes image data, and stores the result in the memory 104. In a second step the transformation module 204 is configured with appropriate parameters and retrieves data from the memory 104 in order to process it. In some embodiments data processed by the transformation module 204 is immediately transferred to the in-loop filter module 206 for processing without going through the memory 104. In other embodiments the transformation module 204 processes data and stores it to memory 104 before the in-loop filter module 206 accesses it. According to this embodiment, the in-loop filter module 206 reads the data from the memory 104, processes the data, and stores it back in memory. In a subsequent step, data is read from memory 104, processed by the entropy module 208, and stored back to the memory 104. In another embodiment, the entropy module 208 reads data from memory 104 and outputs processed data to an external module without going through memory 104.

Figure 2B:
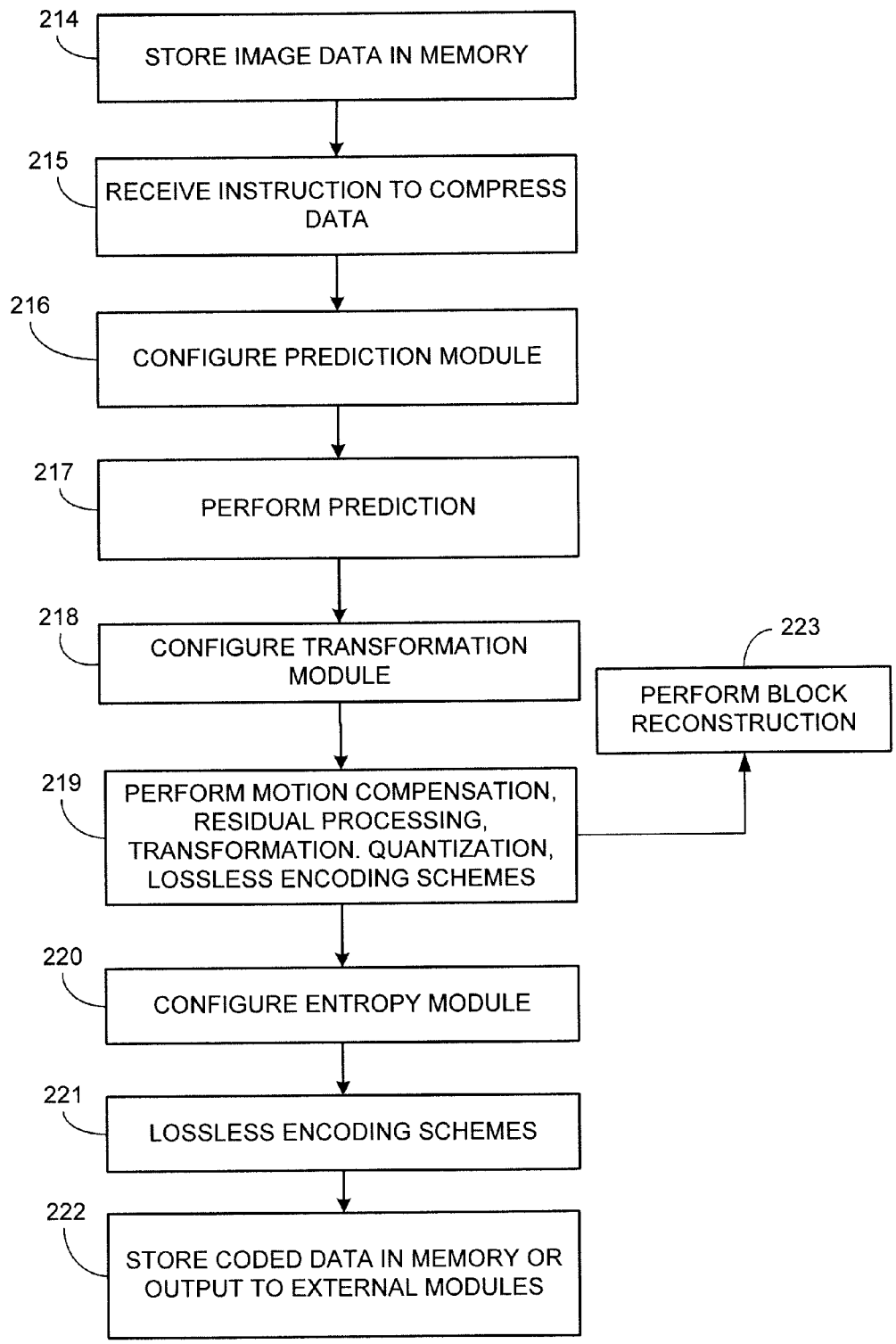

Referring to FIG. 2b, the processing steps performed within codec 102 for compressing image data are described in more detail in accordance with one embodiment. At step 214, image data is stored in memory 104. At step 215, the control module 200 receives parameters indicative of how image data should be processed along with a request to compress the image data. The parameters may comprise the address in memory of the image data that needs to be compressed, the resolution of the image data, the type of compression requested, a Group of Pictures (GOP), a desired output bit rate, etc. In some embodiments, the control module 200 may receive configuration parameters before receiving a request to process image data. These configuration parameters may be used to configure the different modules of the codec 102.

At step 216, the control module 200 configures the prediction module 202, through a communication path according to the received request. According to some embodiments, the prediction module 202 is a register-based engine comprising a set of registers and processing units, with access to the memory 104. The registers may be configured with information comprising the address of image data to be encoded, the number of reference pictures needed, coefficients representative of a quantization parameter (qp), a slice type (e.g. I, B, P), the number of macroblock divisions allowed for each macroblock of the image data, etc. In one embodiment the control module 200 configures the prediction module 202 to process a group of macroblocks. In another embodiment, the control module 200 configures the prediction module 202 to process a slice.

At step 217, the prediction module 202 accesses the image data in memory 104 and determines for each macroblock how the compression will be performed by the subsequent modules of the codec. For example, for a current macroblock the prediction module 202 may determine its corresponding predicted macroblock and a corresponding prediction type (i.e.

intra or inter prediction). In some embodiments, the prediction module 202 outputs for a macroblock, at least one motion vector (or a motion vector difference) and an encoding mode (Inter or intra). The output data is stored in a buffer such as a prediction buffer (PB) in memory 104. The prediction module 202 may also output information related to a quantization parameter for processing of the macroblock in the transformation module 204 and other types of data such as a skip macroblock. This information is stored in memory 104. In some embodiments, the prediction module 202 may divide a macroblock into a plurality of sub-macroblocks and the processing is then performed for each sub-macroblock. The subdivision of a macroblock may be determined according to input parameters.

At step 218, the control module 200 configures the transformation module 204 to process image data. In some embodiments the control module 200 may also configure the in-loop filter module 206 at step 218. In other embodiments, the control module 200 configures the in-loop filter module 206 at a later step. In one example, the control module 200 configures the transformation module 204 with the address of the data to process, the address of at least one reference picture (in some embodiments, the transformation module may need to access more than one reference picture), a quantization parameter and other control parameters necessary to perform compression. In another example, the control module 200 configures the transformation module 204 with the address of the data to process, a quantization parameter and other control parameters necessary to perform compression. The data to be processed by the transformation module 204 may be retrieved from the prediction buffer (PB).

At step 219, the transformation module 204, performs motion compensation or intra prediction, residual processing, frequential transformation and quantization for each macroblock of the image data. Once the data is processed, it may be stored in memory 104 in a transformation buffer (TB). The transformation buffer may comprise for each processed macroblock a corresponding quantized macroblock, a corresponding motion vector(s) (or motion vector difference), a compression type associated with the quantized macroblock, partitioning information if a macroblock is partitioned, and may comprise additional parameters needed by the entropy module 208. The transformation module 204 further performs a plurality of lossless encoding schemes at step 219, as will de described in more detail below.

In some embodiments, the transformation module 204 may reconstruct a macroblock as shown at step 223. In these embodiments, the transformation module 204 performs an inverse quantization on the previously obtained quantized macroblock. Further the transformation module 204 performs inverse frequential transformation and motion compensation and residual processing in order to obtain a reconstructed macroblock associated with the quantized macroblock and to the initial macroblock output to the transformation module 204 to be compressed. The reconstructed macroblock is finally stored in the memory 104 in a reconstructed buffer (RB). Data from the reconstructed buffer may be used as reference pictures during the compression of subsequent picture. While the transformation module 204 is described as processing macroblocks, when a division of the macroblock is requested, the transformation module 204 processes each sub-macroblock of the macroblock.

According to some embodiments, step 223 may further comprise a step of filtering the reconstructed macroblocks with the in-loop filter module 206. More specifically, the in-loop filter module 206 accesses data from the reconstructed buffer (RB) to perform smoothing of sharp edges which can form between decoded macroblocks in order to improve visual quality of decompressed data. In these embodiments, the output of the in-loop filter module 206 is stored in the reconstructed buffer and is used as reference picture during the compression of subsequent macroblocks.

At step 220, the control module 200 configures the entropy module 208 to complete the lossless compression of the image data and to output a final encoded image data. At this step, the control module 200 may also generate a header which will be assembled with the data, once the data has finished being encoded by the entropy module 208. At step 221, the entropy module 208 reads data from the transformation buffer (TB). For each quantized macroblock and its associated data (such as a corresponding motion vector difference, a compression type and partitioning information), the entropy module 208 applies an entropy encoding algorithm. For example, the entropy module 208 may implement one of Context-Based Adaptive Variable Length Coding (CAVLC) or Context-based Adaptive Binary Arithmetic Coding (CABAC) as defined in the H.264 standard. In other embodiments the entropy module 208 may implement any other suitable entropy coding algorithms. At a final step 222, the encoded image data is stored in memory 104 or output to external devices for further processing and/or transmission.

Figure 3:
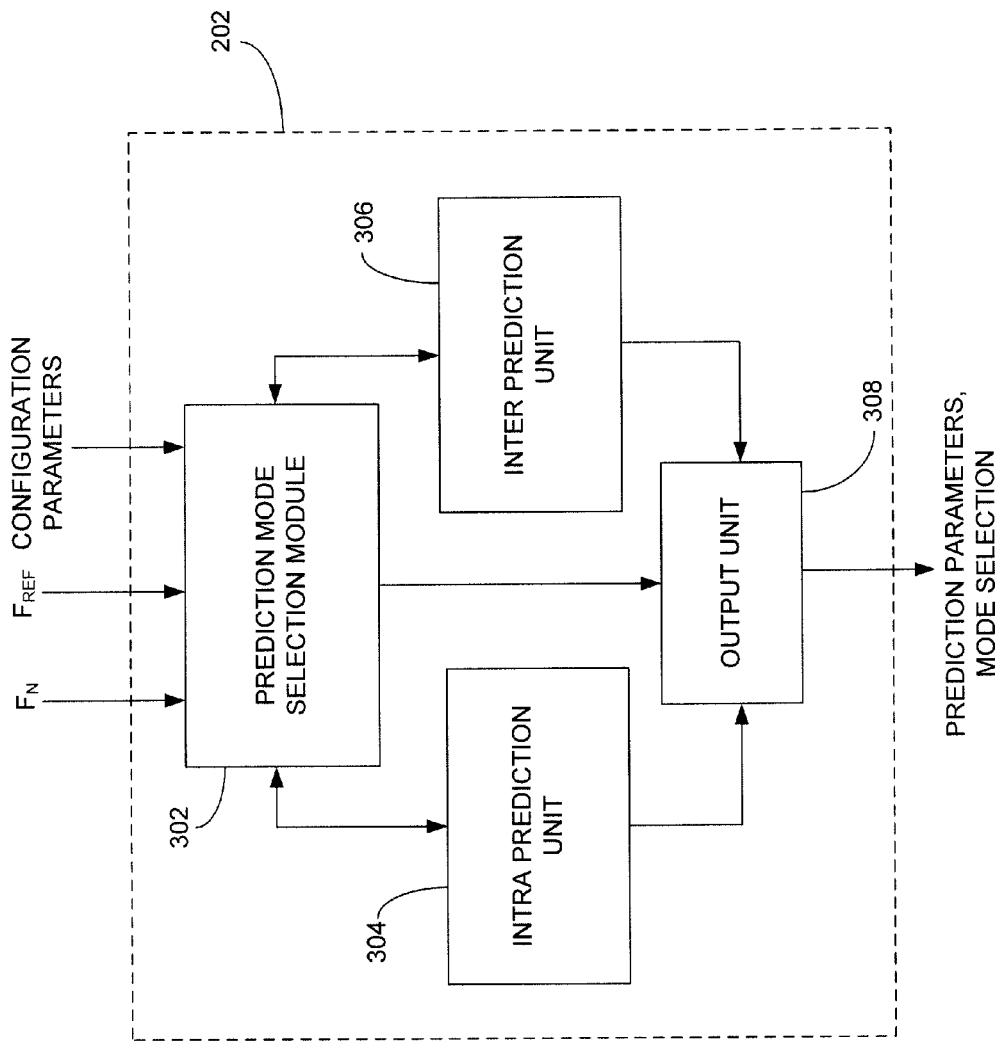

FIG. 3 illustrates an exemplary embodiment for the prediction module 202. A prediction mode selection module 302 receives configuration parameters, image data $F_N$ and reference pictures $F_{REF}$, and chooses between an intra prediction mode and an inter prediction mode for the compression of the image data. If intra prediction is used, information contained only within the current picture may be used for the prediction. If inter prediction is used, information from a previously encoded picture may be used in the prediction. The selection of the prediction mode is made using a variety of factors, such that a difference between a prediction and the image data is minimized.

The selected mode is sent to an output unit 308. An intra prediction unit 304 is used to generate prediction parameters according to an intra mode, such as the partitioning of the image data. An inter prediction unit 306 is used to generate prediction parameters for an inter mode, such as the partitioning, motion vectors, and selected reference pictures. The prediction parameters from both the intra prediction unit 304 and the inter prediction unit 306 are provided to the output unit 308. In some embodiments, both sets of prediction parameters are output with the mode selection. Alternatively, only the prediction parameters corresponding to the selected mode are output from the prediction module 202.

The prediction module 202 may access the memory 104 to read the image data $F_N$ and reference pictures $F_{REF}$. Once the image data has been processed, the resulting prediction parameters and mode selection may be written to memory 104 via memory interface 210. Alternatively, the resulting prediction parameters and mode selection are sent directly to the transformation module 204 without going through memory 104.

Figure 4:
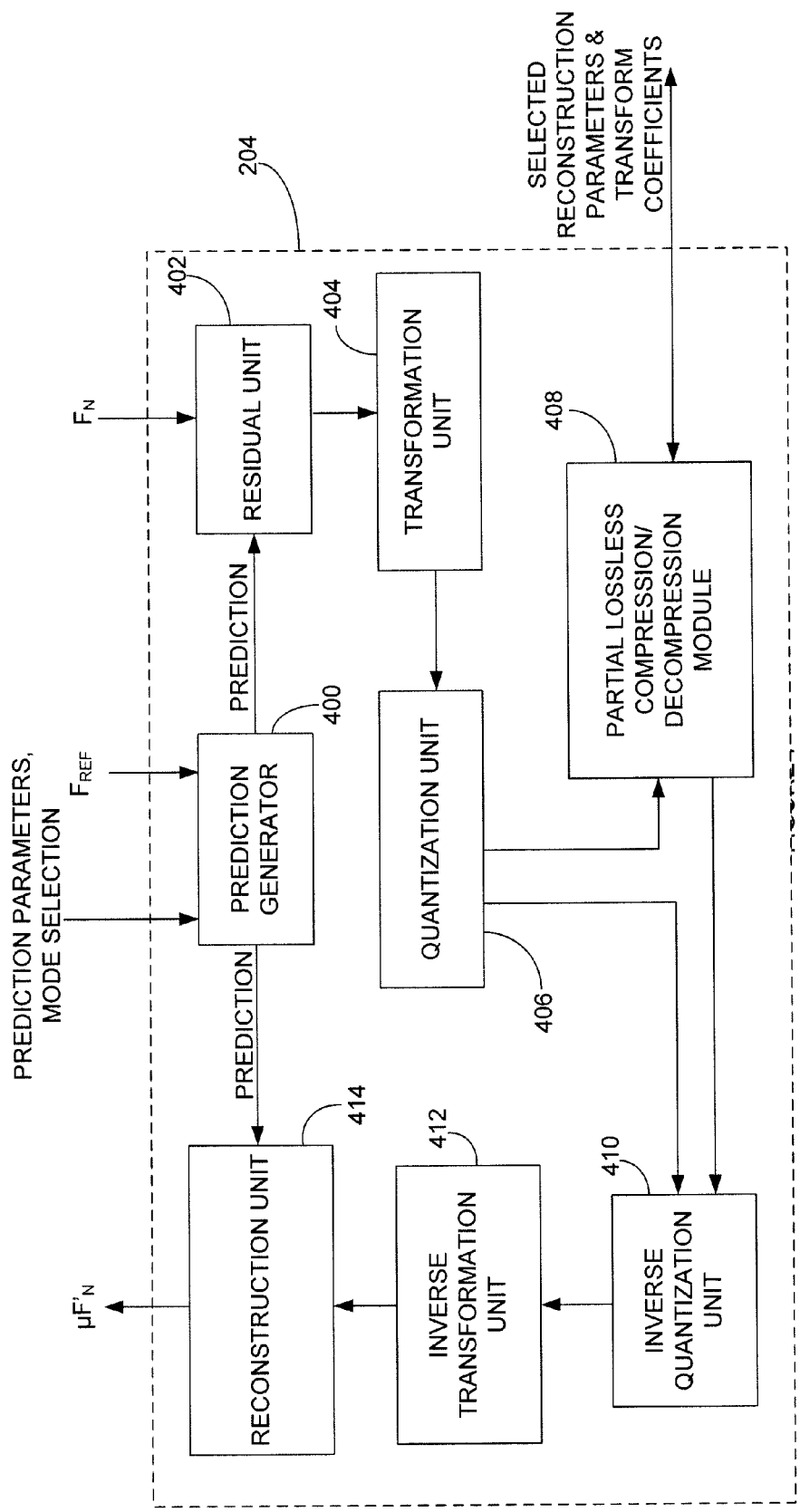

FIG. 4 illustrates an exemplary embodiment of the transformation module 204 for data compression. The prediction parameters, mode selection, and reference pictures $F_{REF}$ are read from memory 104 by the transformation module 204 and used by a prediction generator 400 to generate the prediction. The generated prediction is provided to a residual unit 402 and subtracted from the image data $F_N$ in order to generate the residual. The residual is transformed via a transformation unit 404 and quantized via a quantization unit 406 to obtain a set of quantized transform coefficients.

The transformation applied by the transformation unit 404 depends on the standard followed for the compression. For example, under H.264, various transforms are used depending on the type of residual data that is to be coded: a 4×4 or 8×8 DCT-based transform (Discrete Cosine Transform) is performed on luma and chroma coefficients and a Hadamard transform may be performed on DC coefficients in intra macroblocks predicted in 16×16 mode. Under other standards, other transforms may be used, as appropriate. The quantization unit 406 may be a scaler quantizer, as per H.264.

As well as encoding and transmitting the image data, the transformation module 204 may decode, or reconstruct, the encoded image data in order to provide a reference for further predictions. The quantized transform coefficients generated by the quantization unit 406 are scaled ($Q^{-1}$) via an inverse quantization unit 410 and inverse transformed ($T^{-1}$) via an inverse transformation unit 412 to produce a difference block $D_N'$. The prediction generated by the prediction generator 400 is added to the difference block $D_N'$ by a reconstruction unit 414 to create a reconstructed block $\mu F'_N$. The reconstructed block is a decoded and unfiltered version of the original block. The reconstruction block may be written to memory 104 for future use or passed directly to a filtering module such as the in-loop filter module 206. Alternatively, the in-loop filter module 206 may read the reconstruction block from memory 104. In some embodiments, filtering is performed to reduce the effects of blocking distortion and the reconstructed reference picture is created from a series of blocks $F'_N$. In some embodiments, the in-loop filter module 206 is not used in the compression of image data and may not be included in the codec 102.

A portion of the entropy coding is performed in the transformation module 204. This allows reduction of the data written to memory by the transformation module 204 as well as the data read from memory by the entropy module 208. It also reduces the required bandwidth between the transformation module 204, the entropy module 208 and the memory 104 while maintaining the performance of the transformation module 204 independent from the performance of the entropy module 208. A partial lossless compression module 408 receives the reconstruction parameters and transform coefficients as output by the quantization unit 406 and outputs only selected ones thereof, after having applied part of an entropy coding scheme.

Figure 5A:
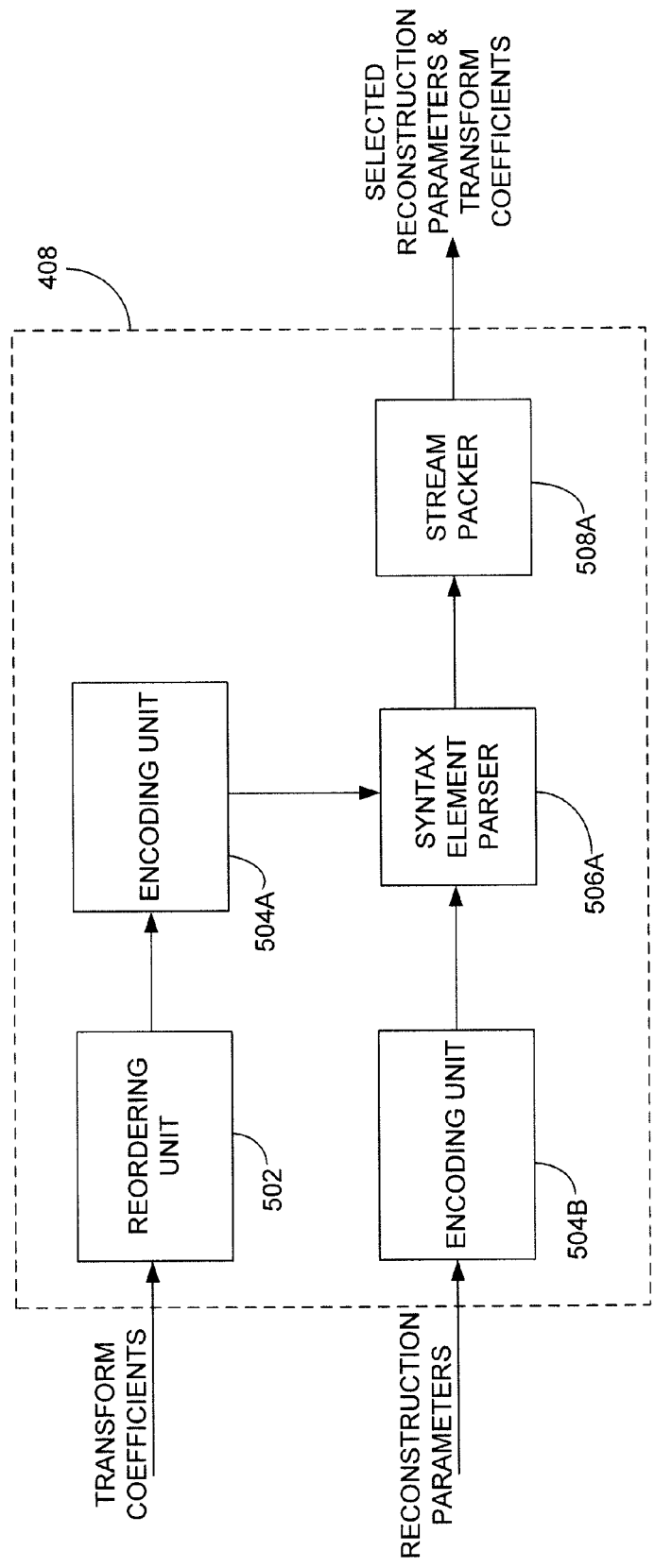
FIG. 5a is a block diagram of an exemplary partial lossless compression module for image data compression.

FIG. 5a is an exemplary embodiment of the partial lossless compression module 408. Reordering of the transform coefficients is performed by reordering unit 502 and transmitted to encoding unit 504a. Reconstruction parameters are sent directly to encoding unit 504b. In another embodiment, reordering of the transform coefficients is performed by reordering unit 502 and the reordered transform coefficients are sent directly to syntax element parser 506a (Not shown).

Encoding unit 504a performs entropy encoding on the reordered transform coefficients using a variable length encoding. In one example, the variable length encoding scheme may satisfy residual block CABAC syntax. In particular, this may be done by mapping a 2×2, 4×4, or 8×8 block of quantized transform coefficients to a 4, 16, or 64-element array, respectively. Each element array is then encoded with a set of parameters such as coded_block_flag (which specifies whether the block contains a non-zero value), signif_coef_flag[i] (which specifies whether the transform coefficient level at position i is a non-zero value), lst_signig_coef_flag[i] (which specifies for the position i whether there are non-zero transform coefficients for subsequent scanning positions), abs_level_minus1[i] (which is the absolute value of a transform coefficient minus 1) and level_sign_flag[i] (which specifies the sign of a coefficient). Finally, the abs_level_minus1[i] is encoded according to UEG 0 as per H.264. Other entropy coding compression schemes may also be applicable.

Similarly, encoding unit 504b performs entropy coding on some or all the reconstruction parameters using at least one entropy coding mapping. Table 1 illustrates examples of parameters to be encoded by encoding unit 504b.

TABLE 1

| Parameters | Description |
| --- | --- |
| Sequence-, picture-and slice-layer syntax elements | Headers and parameters |
| Macroblock type | Prediction method for each coded macroblock |
| Coded block pattern | Indicates which blocks within a macroblock contain coded coefficients |
| Quantizer parameter | Transmitted as a delta value from the previous value of QP |
| Reference frame | |
| Reference frame index | Identify reference frame(s) for inter prediction |
| Motion vector | Transmitted as a difference (mvd) from predicted motion vector |

Syntax element parser 506a receives the converted transform coefficients and the reconstruction parameters, a first group of which have been encoded, and parses all syntax elements. Essentially, it performs a first culling of the data so as to remove unnecessary information and conserve only selected reconstruction parameters and encoded transform coefficients that will ultimately form part of the compressed bit stream. The culling may be performed in order to include in the final compressed bit stream only the syntax elements complying with a standard compression syntax (such as the H.264 syntax, or MPEG2 syntax). For example, if a macroblock is skipped during the prediction, transformation and quantization steps, there is no need to include its corresponding coefficients, motion vectors and other reconstruction parameters in the final compressed bit stream. In this example, only skip information is selected and sent to the stream packer 508a to be written to memory. A stream packer 508a concatenates the parsed data and writes it to memory.

Figure 5B:
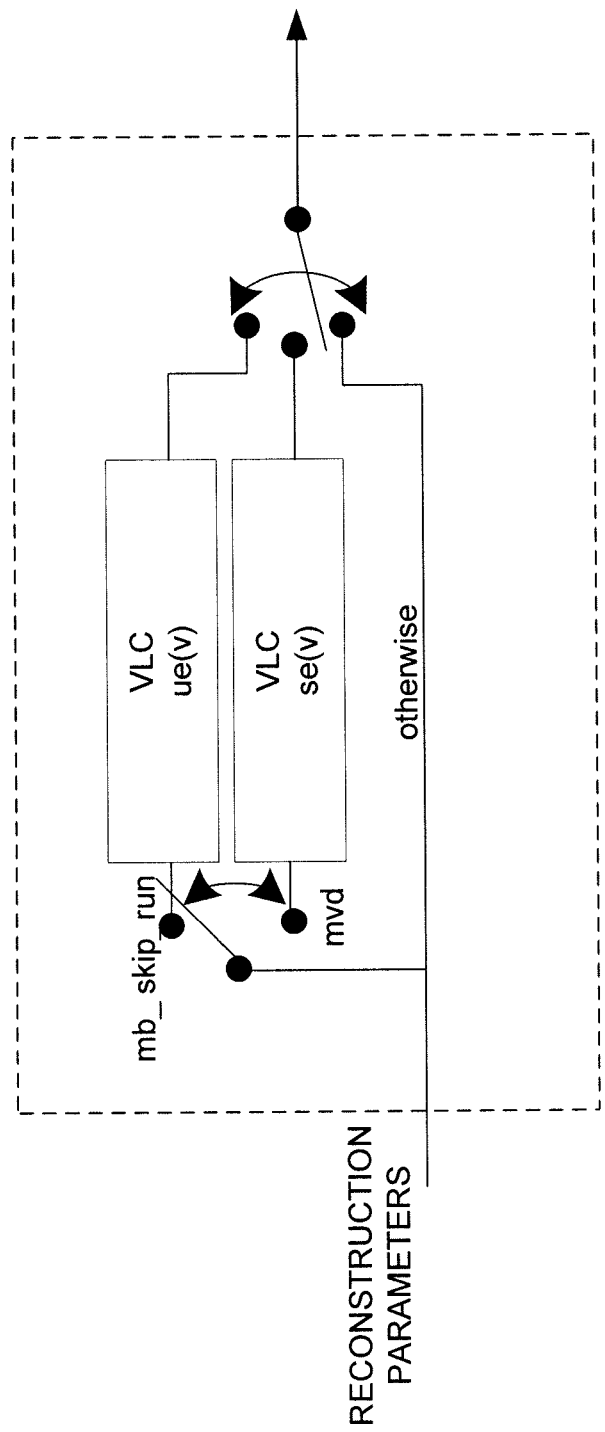
FIG. 5b is an exemplary illustration of data flow through an encoding unit from the transformation module in accordance with CAVLC.

FIG. 5b illustrates an exemplary embodiment for the flow of data in encoding unit 504b in accordance with a CAVLC encoding mode (entropy coding mode flag=0). A first set of reconstruction parameters is encoded according to at least one Variable Length Coding scheme. For example, reconstruction parameters may be sorted such that a "ue" mapping type, or unsigned direct mapping, is performed on the syntax element "mb_skip_run", which specifies the number of consecutive skipped macroblocks. An "se" mapping type, or signed mapping, is performed on the syntax element "mvd", which refers to the motion vector difference. All other reconstruction parameters are sent straight through to the output without further encoding.

Figure 5C:
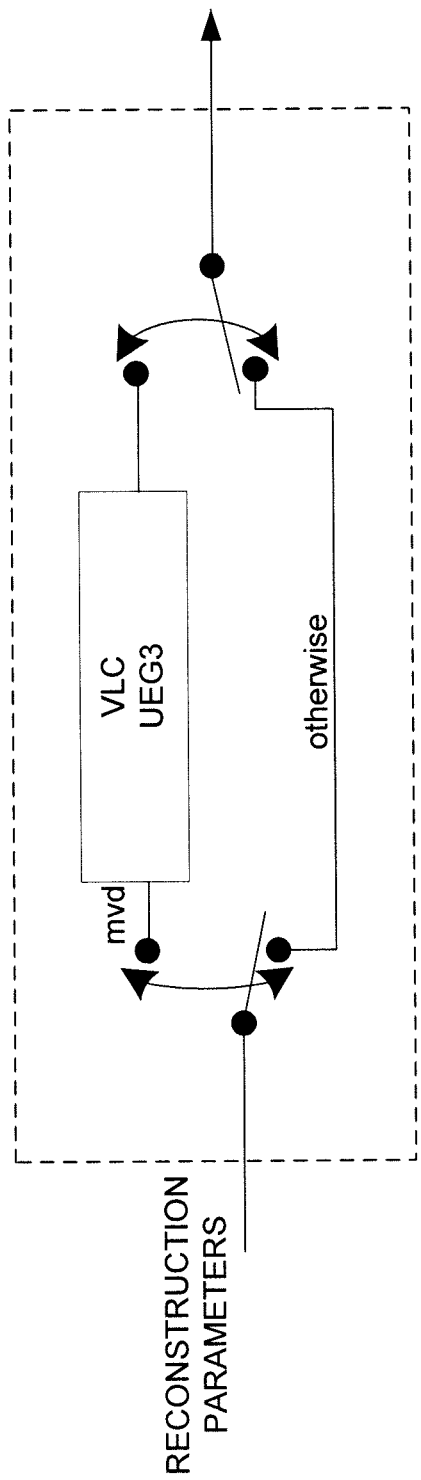
FIG. 5c is an exemplary illustration of data flow through an encoding unit from the transformation module in accordance with a CABAC mode.

FIG. 5c illustrates an exemplary embodiment for the flow of data in encoding unit 504b in accordance with a CABAC encoding mode (entropy coding mode flag=1). A first set of parameters is encoded according to at least one Variable Length Coding scheme. For example, the motion vector difference "mvd" may be encoded using "UEG 3" mapping type while all other reconstruction parameters are sent straight through to the output without further encoding.

Figure 6A:
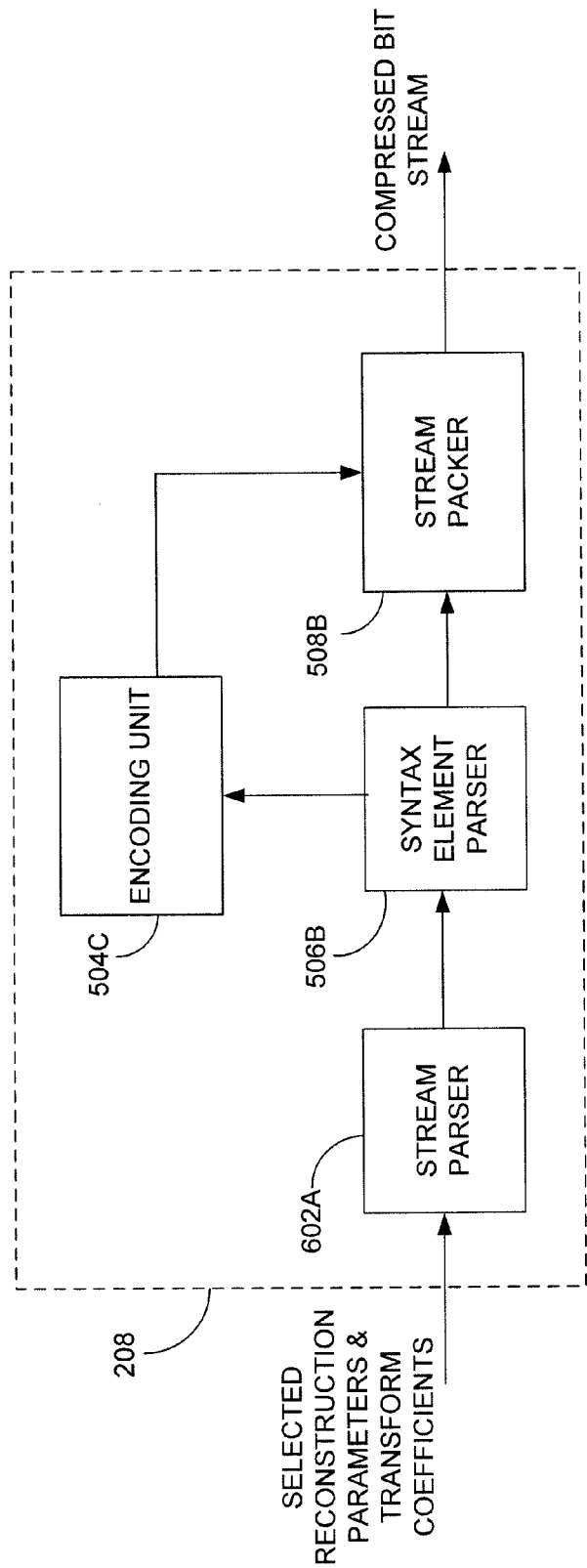
FIG. 6a is a block diagram of an exemplary entropy module for image data compression.

Once the image data, at this point composed of the selected reconstruction parameters and encoded transform coefficients, has been written to memory by the transformation module 204, it may be read by the entropy module 208 as illustrated, by way of an exemplary embodiment, in FIG. 6a. A stream parser 602a reads the data from memory 104 and recovers the image data for further processing. A syntax element parser 506*b* serves to sort through the data and to either send it to another encoding unit 504*c* or bypass the encoding unit 504*c* and send it directly to stream packer 508*b*. Note that in some embodiments, all of the image data is sent to encoding unit 504*c*.

The encoding unit 504*c* is configured to perform the remaining steps of the entropy coding not performed by the partial lossless compression module 408 in the transformation module 204. A stream packer 508*b* will perform the last steps in the entropy coding process in order to generate the compressed bit stream. The compressed bit stream may be written to memory or sent directly to another module inside the system 100 or external thereto.

Figure 6B:
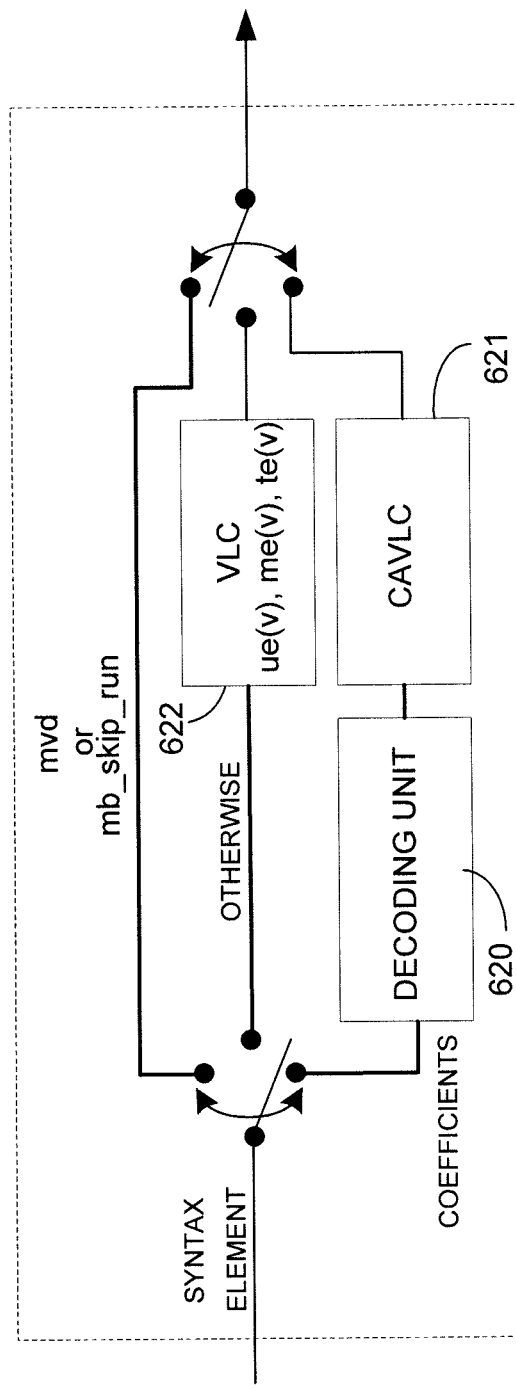
FIG. 6b is an exemplary illustration of data flow through the encoding unit from the entropy module in accordance with CAVLC.

The encoding scheme applied by encoding unit 504*c* varies as a function of a given compression scheme or standard followed by the codec 102 as well as the entropy coding mode. An exemplary embodiment for data flow is illustrated in FIG. 6*b* in accordance with the CAVLC entropy coding mode as per the H.264 standard. In this embodiment part of the syntax elements received by the encoding unit 504*c* have been encoded according to variable length encoding schemes in the transformation module 204 and therefore do not need to be modified before being sent to the stream packer 508*b*. For example, the motion vector difference and "mb_skip_run" are processed in encoding unit 504*b*, they do not need to be further encoded. The other reconstruction parameters are encoded with various mapping types as appropriate, such as Truncate-Exp-Golomb (te), unsigned direct mapping (ue), and mapped symbols (me), by unit 622. Each of these mappings is designed to produce short codewords for frequently-occurring values and longer codewords for less common parameter values. Transform coefficients, having been converted according to Variable Length encoding scheme by encoding unit 504*a*, are reconverted into their original format by a decoding unit 620. The transform coefficients are then encoded as per the standard definition for CAVLC by unit 621. That is to say, the number of coefficients and trailing ones are encoded, the sign of each trailing one is encoded, the levels of the remaining nonzero coefficients are encoded, the total number of zeros before the last coefficient are encoded, and each run of zeros is encoded.

Figure 6C:
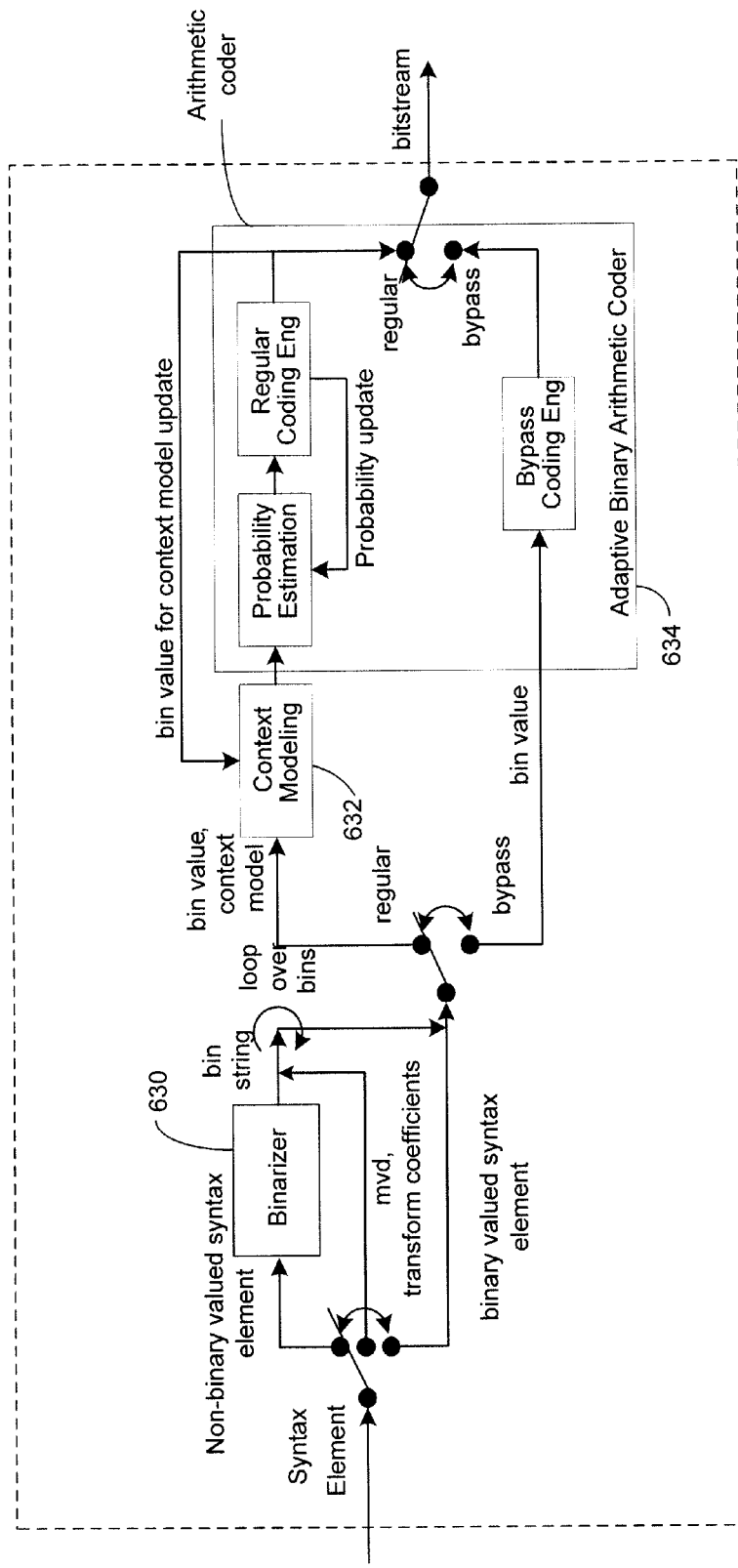
FIG. 6c is an exemplary illustration of data flow through the encoding unit from the entropy module in accordance with a CABAC mode.

FIG. 6*c* illustrates another embodiment for the dataflow through encoding unit 504*c*, in accordance with CABAC entropy coding mode. Non-binary valued syntax elements and any symbols with more than two possible values are converted into a binary code by a binarizer 630. Motion vectors and transform coefficients were previously encoded in encoding unit 504*b* and therefore bypass the binarization step. Various entropy coding schemes, such as unary, truncated unary, fixed-length and LUT, are applied as appropriate by the binarizer 630. Context modeling 632 is performed for some of the syntax elements. A probability model for one or more bins of the binarized symbol is chosen from a selection of available models depending on the statistics of recently-coded data symbols. The context model stores the probability of each bin being '1' or '0'. An arithmetic coder 634 then encodes each bin according to the selected probability model and the selected context model is updated based on the actual coded value.

During the compression process, a header may be generated by the control module 200 to be assembled with the encoded data before or during the output of the data from the codec 102. Alternatively, the header is passed through the different modules of the codec 102, and it is processed along with the portion of the picture and is included in the compressed bit stream. In a final step, the control module 200 may inform the application that the data has been compressed and is available as encoded image data. In accordance with some embodiments, the output of the codec 102 is Video Coding Layer data, i.e. a sequence of bits representing the coded image data, which are mapped to a Network Abstraction Layer (NAL) prior to transmission or storage. Each NAL unit contains a Raw Byte Sequence Payload (RBSP), a set of data corresponding to coded video data or header information. A coded video sequence is represented by a sequence of NAL units that can be transmitted over a packet-based network or a bit stream transmission link or stored in a file.

Figure 7:
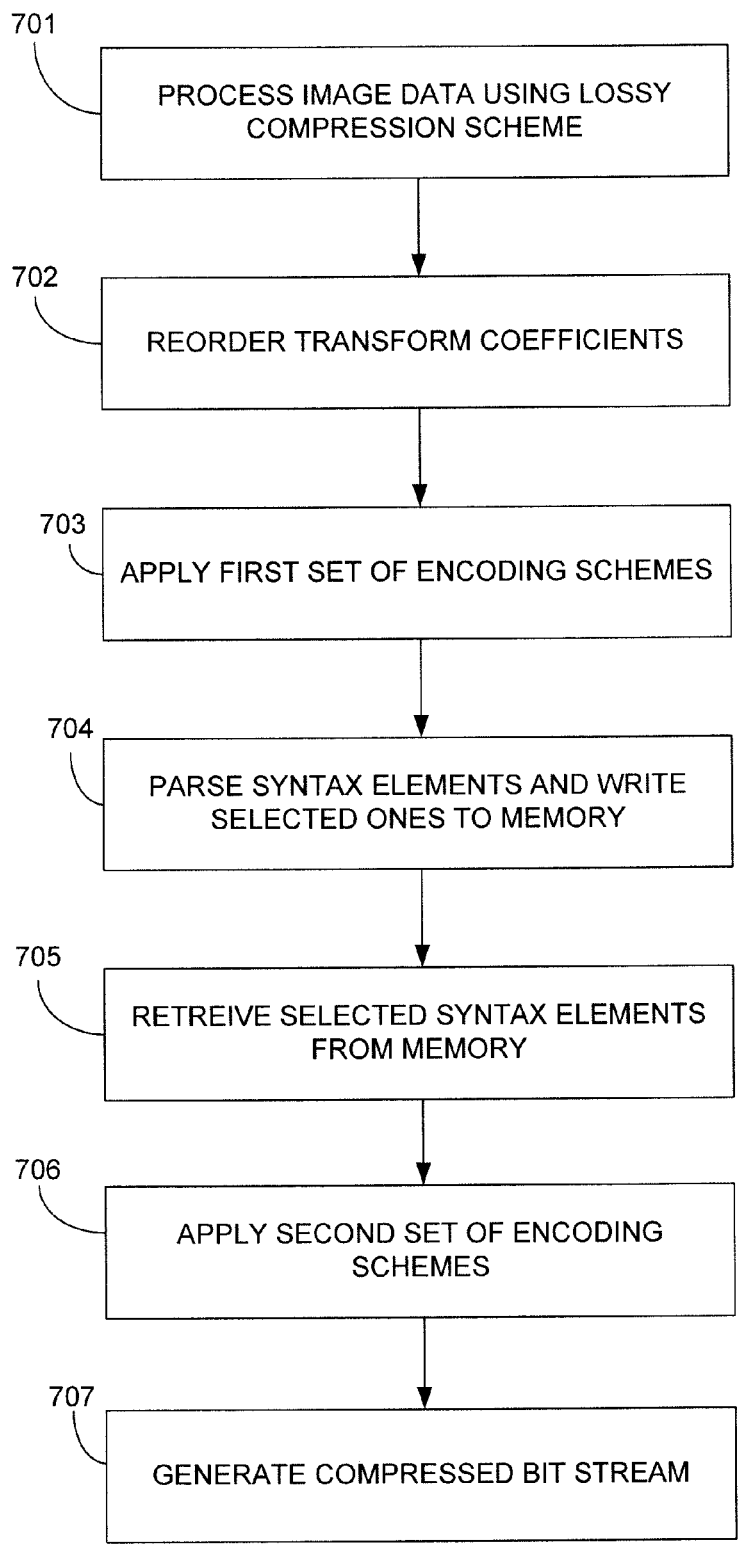
FIG. 7 is a flowchart of an exemplary method for performing lossless compression of the image data using the codec of FIG. 2a in a compression configuration.

Referring now to FIG. 7, there is illustrated an exemplary flowchart for the method of performing image data compression using the codec 102 in a compression mode. In a first step 701, the image data is processed in accordance with a lossy compression scheme in order to generate a set of reconstruction parameters and transform coefficients. Any of the embodiments described above for lossy compression may be used. In step 702, the transform coefficients are reordered in a first module, such as transformation module 204 using reordering unit 502. As per step 703, a first set of encoding schemes are applied to a first portion of the reconstruction parameters and the transform coefficients in the first module, for example using encoding unit 504*a* and encoding unit 504*b*. In step 704, the syntax elements having been initially processed for entropy coding are parsed and selected ones that will form part of the compressed bit stream are written to memory 104. This may be done, for example, by the syntax element parser 506*a* and the stream packer 508*a*.

Moving on to step 705, the selected syntax elements previously written to memory by the first module are retrieved from memory by the second module, for example entropy module 208. The selected syntax elements comprise reconstruction parameters and transform coefficients, some of which have already been entropy coded. A second set of encoding schemes are applied to a second portion of the reconstruction parameters and transform coefficients, namely those that have not yet been entropy coded, in step 706 in the second module, such as the encoding unit 504*c* in the entropy module 208. In some embodiments, the second portion of reconstruction parameters and transform coefficients includes some of the reconstruction parameters and transform coefficients in the first portion. In some embodiments, the second portion of reconstruction parameters and transform coefficients includes all of the reconstruction parameters and transform coefficients in the first portion. Once all syntax elements have been entropy coded as appropriate, the compressed bit stream may be generated, as per step 707.

Figure 8A:
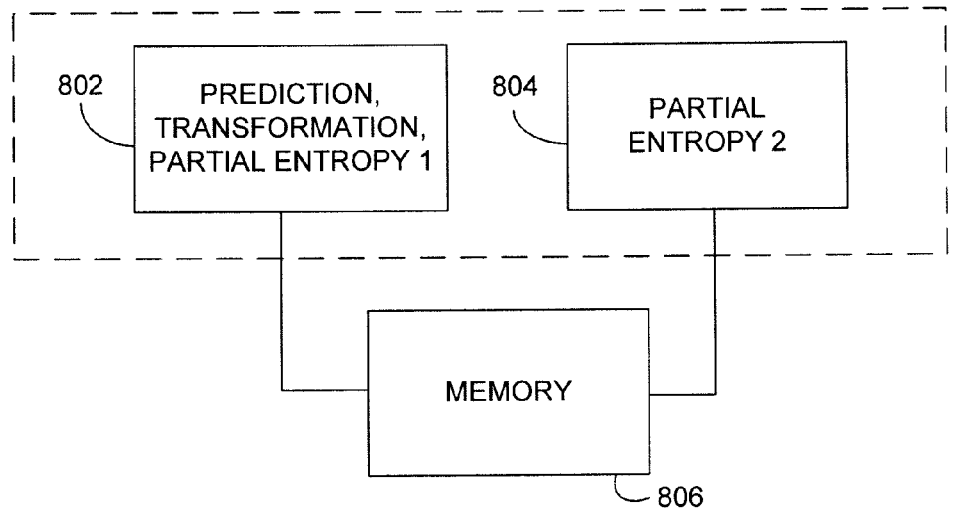
FIGS. 8a and 8b are schematic diagrams illustrating different configurations for the codec when entropy coding is separated between two modules.
Figure 8B:
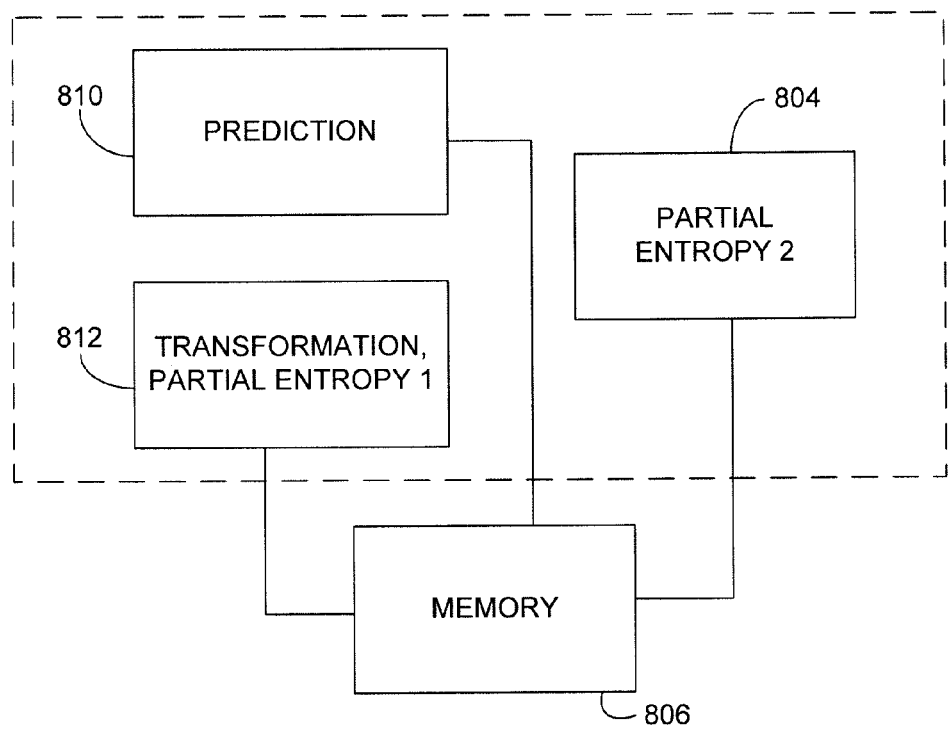

Steps 702, 703 and 704 are all performed by a first module. This module may be the transformation module 204 or it may be another structural implementation of the prediction module 202 and transformation module 204 as described above. FIGS. 8*a* and 8*b* are exemplary illustrations of such structural implementations. For example, in FIG. 8*a*, the functions associated with the prediction module 202 and the transformation module 204 (as described above) are performed in a same module 802. In this embodiment, steps 702, 703 and 704 are also performed by this same module 802. Steps 705, 706, and 707 are performed by another module 804. Module 802 and module 804 are connected to a memory 806. Module 804 reads data from memory after it has been processed and stored back to memory by module 802. In FIG. 8*b*, prediction and transformation are performed in separate modules 810, 812, the first part of the entropy coding (steps 702, 703 and 704) is performed in the transformation module 812 and the second part of the entropy coding (steps 705, 706, and 707) is performed in another module 804. The three modules 810, 812 and 804 are connected to a memory 806. The first part of entropy coding ends with having selected syntax elements written to memory from the transformation module. The second part of entropy coding begins with having the selected syntax elements read from memory by a second module distinct from the first module and processed by the second module to continue the entropy coding process.

The codec 102 as described above and shown in FIG. 2a may also comprise additional components (not shown), such as a filtering module, a display module, an output module, and an input module. For example, the filtering module may be used to filter a picture or a stream of image data before being processed by the prediction module 202. The filtering module may also be used to remove noise from a picture before the different compression steps are performed on the picture. The display module may be used to output an uncompressed video stream stored in the memory 104 to a display monitor at a given display rate. The output module may be used to output compressed or uncompressed image data to processing modules external to the codec 102. The input module may be used to receive uncompressed image data from an external source such as a video camera. The input module may also receive compressed image data. The different modules of the codec 102 are connected to the memory 104 through the memory interface 210.

The architecture of the codec as illustrated in FIG. 2a allows certain steps of the compression process to occur in parallel and allows the performance (or efficiency) of some modules to be decoupled from the performance of other modules. For example, the entropy module 208 may read data from the memory 104 independently of the processing performed by the transformation module 206.

In some embodiments, the codec 102 is configured to decompress image data. The codec 102 may receive requests to decompress encoded image data from an application running on an external processing unit. In general, compressed image data is stored in the memory 104 and requests are sent to the codec 102 to decompress the image data. Following the receipt of the decompression requests, in a first step the control module 200 may configure the entropy module 208 to process the image data. In a second step, the control module 200 may configure the transformation module 204 to process data only once the entropy module 208 has finished processing the data. In some embodiments, the control module 200 of the codec 102 configures the entropy module 208 and the transformation module 204 with appropriate parameters for decompressing the image data. The codec 102 may also configure the in-loop filter 206 to be used during the steps of data decompression. In some examples, the in-loop filter 206 may not be used during decompression and therefore it does not need to be configured.

Once configured the entropy module 208 accesses the data in memory 104 through the memory interface 210 and stores the result of its processing in the memory 104. In other embodiments, the compressed data is not stored in memory 104 prior its processing by the entropy module 208. Instead the data is received by the entropy module 208 directly from an external source and processed upon receipt. In a second step the transformation module 204 retrieves data from the memory 104 in order to process it. In some embodiments data processed by the transformation module 204 is immediately transferred to the in-loop filter module 206 for processing without going through the memory 104. In other embodiments the transformation module 204 processes data and stores it to memory 104 before the in-loop filter module 206 accesses it. According to this embodiment, the in-loop filter module 206 reads the data from the memory 104, processes the data and stores it back in memory. In some embodiments, the decompression of data is complete once the in-loop filter 206 is done processing the data. In other embodiments, the decompression of data is complete once the transformation module 204 has finished processing the data and no filtering is required. In a final step, the control module 200 informs the application that the data has been decompressed and is available as decoded image data.

Figure 9:
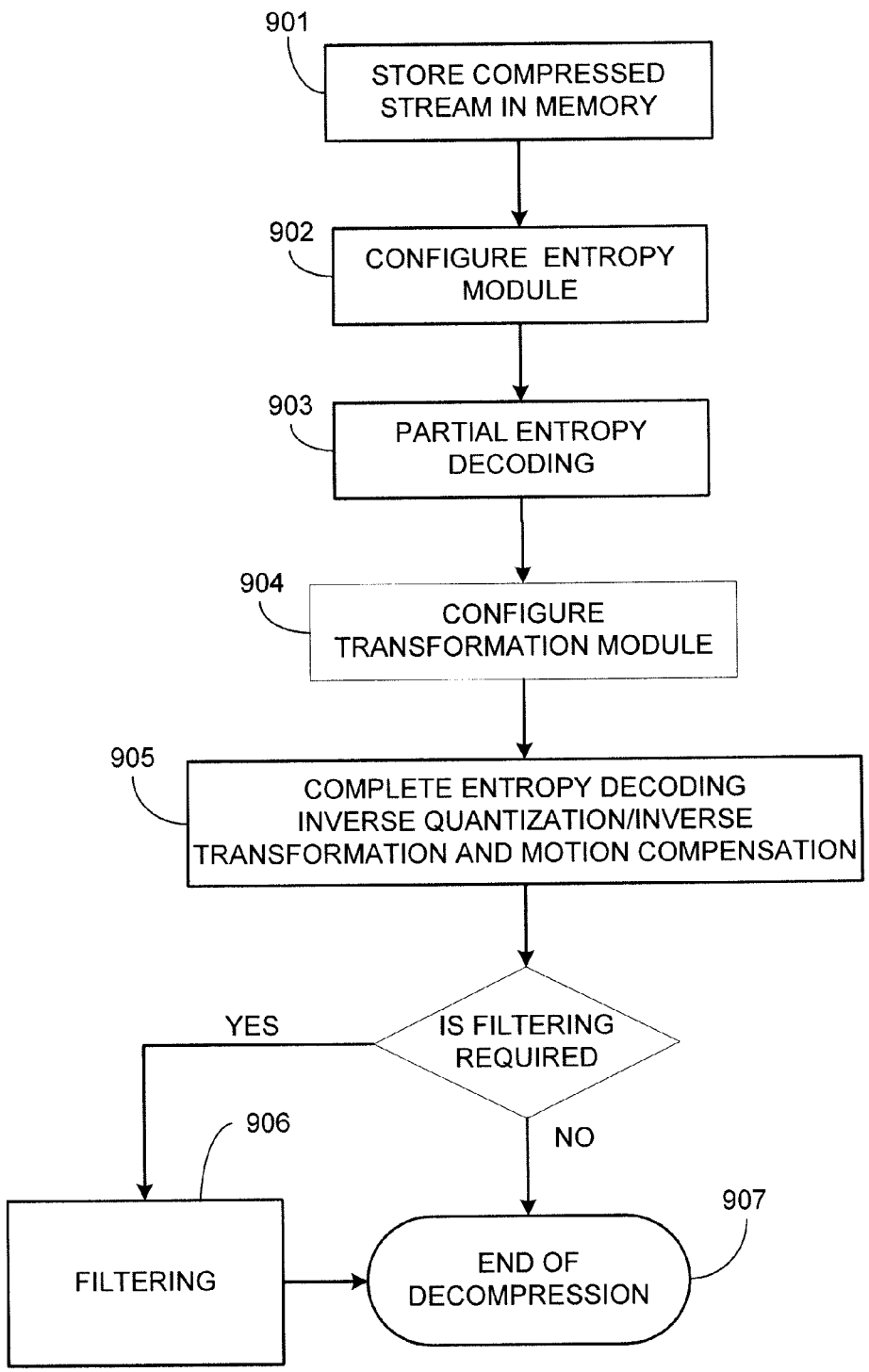

Referring to FIG. 9, exemplary steps of data decompression are described. At step 901 the compressed data is stored in memory 104. The data is a stream of compressed image data or a portion of a total stream of compressed data. An application may need to decompress a full stream of compressed data but may store in memory 104 only a portion of the stream for decompression by the codec 102 at a given moment.

At step 902, the control module 200 configures the entropy module 208 with appropriate parameters to decompress the received data. At step 903 the entropy module 208 accesses the compressed stream and performs partial entropy decoding to output an intermediate buffer. The intermediate buffer comprises reconstruction parameters and quantized coefficients, some of which may still be totally or partially losslessly encoded. At step 904, the control module 200 configures the transformation module 204. At step 905, the transformation module 204 reads reference data from memory 104 and from the intermediate buffer in the memory 104. Reference data is previously decoded pictures. At this step the transformation module 204 completes the lossless decoding of the reconstruction parameters and the quantized coefficients and performs inverse quantization, inverse transformation and motion compensation. The output of the processing by the transformation module 204 is decoded image data. The decoded data may further be processed by the in-loop filter 206 at step 906 to provide a final decoded image data. The control module 200 configures the in-loop filter module 206 only if needed. If the filtering is not requested, then the decompression is complete at step 905 and the decoded data output from the transformation module 204 is stored in memory 104. Finally, at step 907, the control processing module 200 informs the application that the decompression is complete.

Figure 10A:
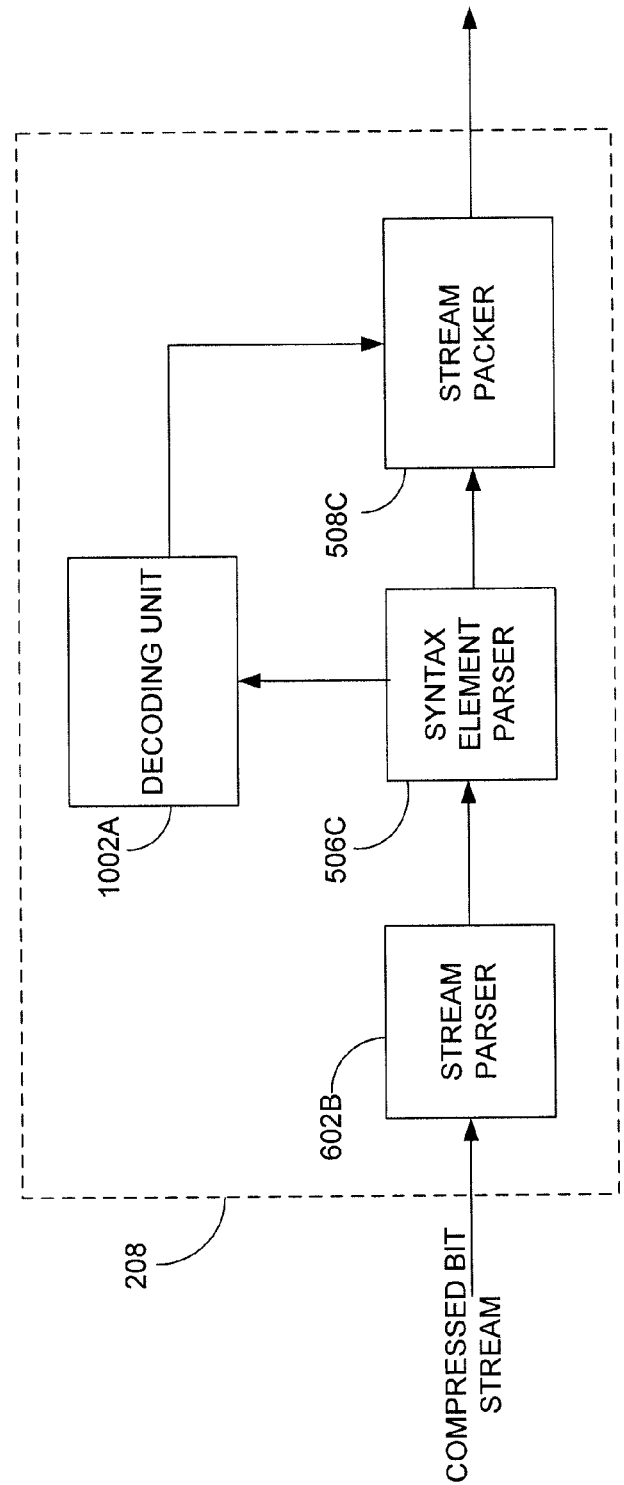
FIG. 10a is a block diagram of an exemplary entropy module for image data decompression.

FIG. 10a is an exemplary embodiment for the entropy module 208 when the codec 102 is configured to decompress image data. A stream parser 602b reads the compressed data from memory 104. A syntax element parser 506c serves to sort through the compressed data and to either send it to a decoding unit 1002a or bypass the decoding unit 1002a and send it directly to stream packer 508c. Note that in some embodiments, all of the compressed image data is sent to decoding unit 1002a.

The decoding unit 1002a is configured to perform part of the entropy decoding. A stream packer 508c will pack the partially decompressed bit stream such that it may be written to memory or sent directly to another module inside the system 100 or external thereto.

Figure 10B:
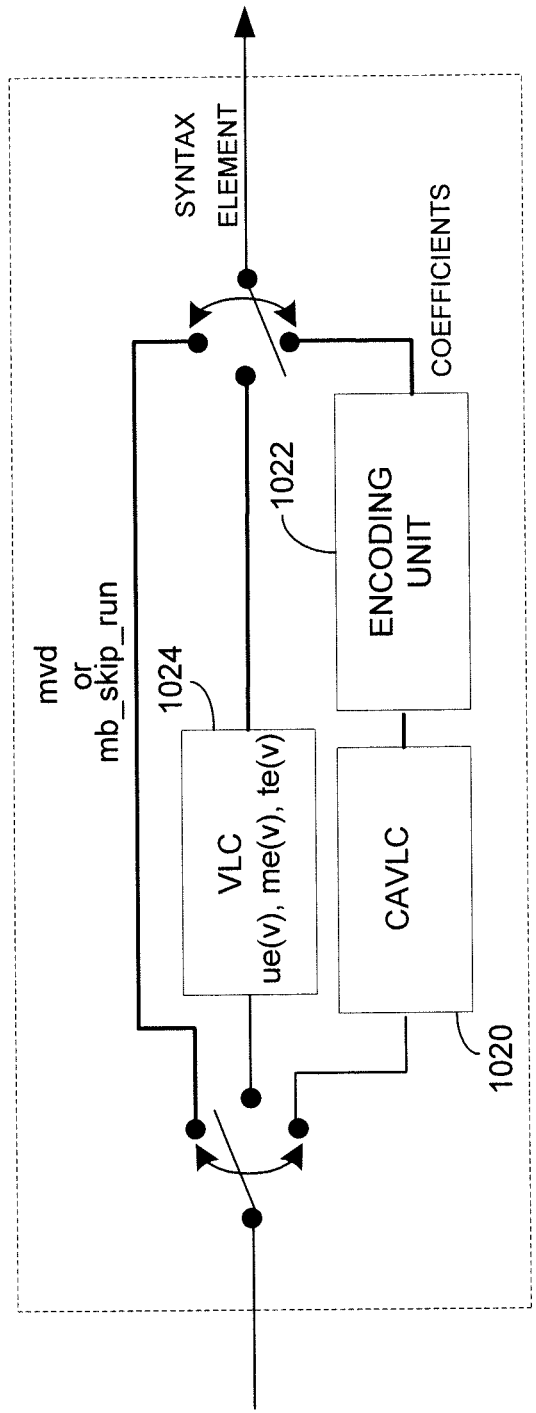
FIG. 10b is an exemplary illustration of data flow through the decoding unit from the entropy module in accordance with CAVLC.

The decoding scheme applied by decoding unit 1002a varies as a function of a given decompression scheme or standard followed by the codec 102 as well as the entropy decoding mode. An exemplary embodiment for data flow through decoding unit 1002a is illustrated in FIG. 10b in accordance with the CAVLC entropy decoding mode. In this embodiment part of the compressed data received by the decoding unit 1002a does not need to be modified before being sent to the stream packer 508c, for example, the motion vector difference and "mb_skip_run". The other parameters are decoded with various mapping types as appropriate, such as Truncate-Exp-Golomb (te), unsigned direct mapping (ue), and mapped symbols (me) by unit 1024. In this embodiment, the compressed coefficients included in the bit stream are sent to the CAVLC module 1020 for decoding. In some embodiments, once decoded according to Context Adaptive Variable Length Coding scheme, the decoded transform coefficients are processed by an encoding unit 1022. The decoded transform coefficients are converted according to Variable Length encoding scheme in order to reduce bandwidth and memory space when the coefficients are stored in memory 104 by the entropy module 208. In one example, the variable length encoding scheme may satisfy residual block CABAC syntax. In particular, this may be done by mapping a 2×2, 4×4, or 8×8 block of quantized transform coefficients to a 4, 16, or 64-element array, respectively. Each element array is then encoded with a set of parameters such as coded_block_flag (which specifies whether the block contains a non-zero value), signif_coef_flag[i] (which specifies whether the transform coefficient level at position i is a non-zero value), lst_signig_coef_flag[i] (which specifies for position i whether there are non-zero transform coefficients for subsequent scanning positions), abs_level_minus1[i] (which is the absolute value of a transform coefficient minus 1) and level_sign_flag[i] (which specifies the sign of a coefficient). Finally, the abs_level_minus1[i] is encoded according to UEG 0 as per H.264. Other entropy coding compression schemes may also be applicable In other embodiments, the decompressed transform coefficients may be stored to memory directly without being processed by the encoding unit 1022. In these embodiments, the lossless decompression of the coefficients is completed once they are processed by the CAVLC module 1020. The only step remaining before they are inverse quantized and inverse transformed is the inverse reordering.

Figure 10C:
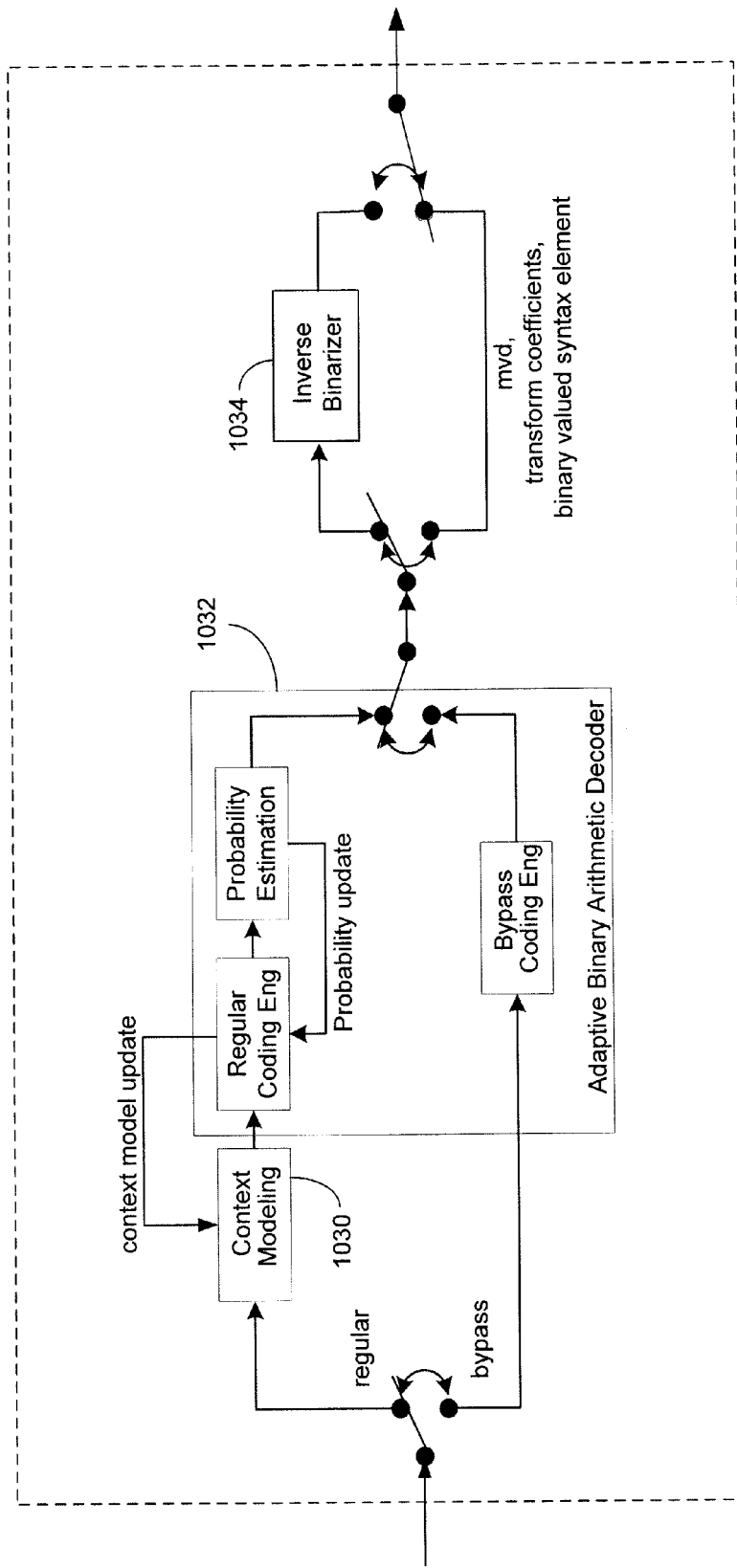
FIG. 10c is an exemplary illustration of data flow through the decoding unit from the entropy module in accordance with a CABAC mode.

FIG. 10c illustrates another embodiment for the dataflow through decoding unit 1002a, in accordance with a CABAC entropy decoding mode. Context modeling 1030 is performed for some of the compressed data before being processed by an adaptive binary arithmetic decoder 1032. Non-binary valued syntax elements are converted from a binary code by an inverse binarizer 1034. Motion vectors, transform coefficients and binary valued syntax elements bypass the inverse binarization step. Various entropy decoding schemes, such as unary, truncated unary, fixed-length and LUT, are applied as appropriate by the inverse binarizer 1034.

Figure 11A:
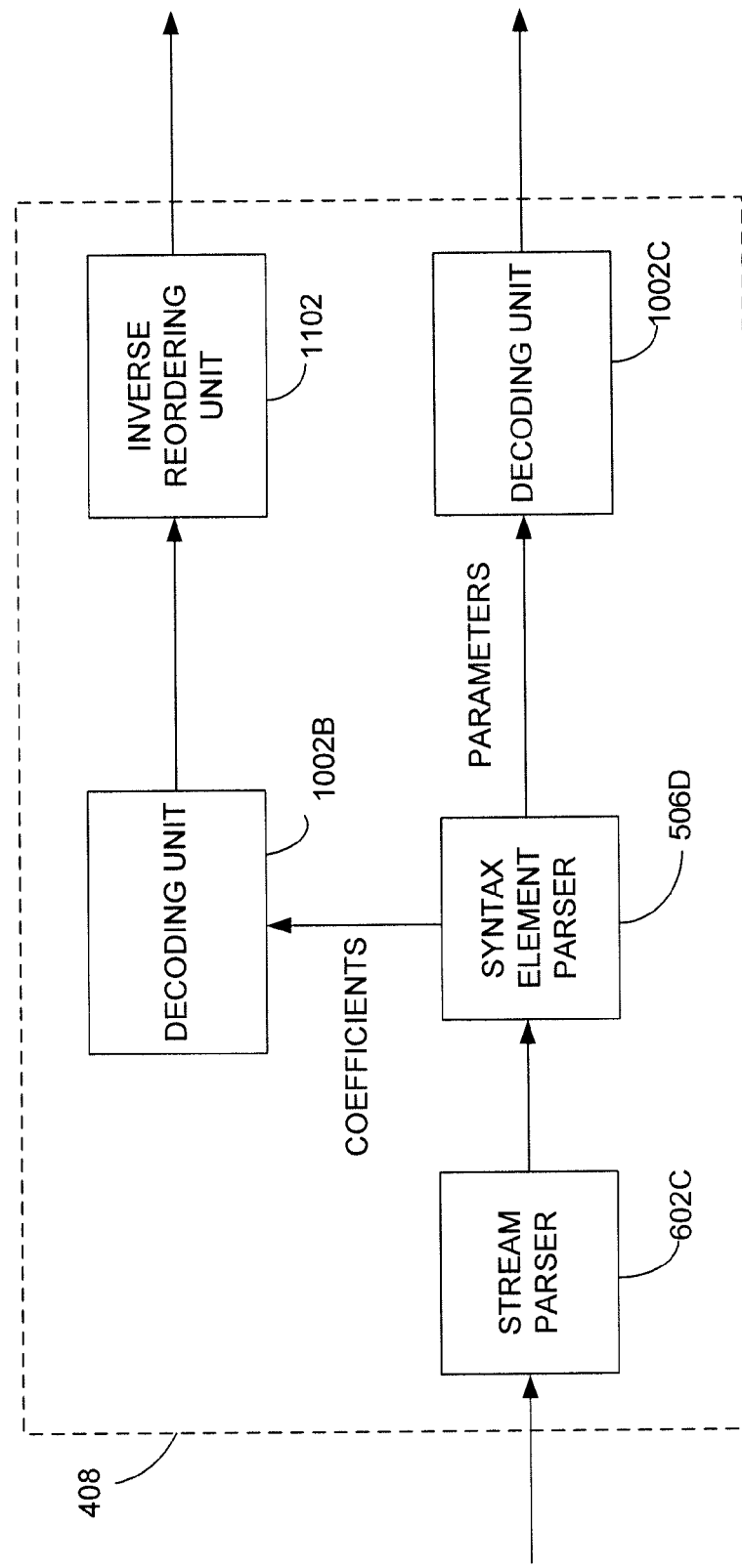
FIG. 11a is a block diagram of an exemplary partial lossless decompression module for image data decompression.

FIG. 11a is an exemplary embodiment of a partial lossless decompression module 408 when the codec 102 is configured for decompression. A stream parser 602c reads the data from memory 104 and provides it to the syntax element parser 506d. Coefficients are sent to decoding unit 1002b while parameters are sent to decoding unit 1002c. Reordering of the coefficients is performed by inverse reordering unit 1102 and sent to inverse quantization unit 410.

In one embodiment, elements may be decoded by decoding unit 1002b regardless whether the codec is operating in a CABAC or a CAVLC mode. In this embodiment, when the codec 102 is operating in a CAVLC mode, the coefficients have been previously decompressed according to CAVLC and consequently encoded according to a Variable Length encoding scheme in an encoding unit of the entropy module 208. Further, the encoded coefficients are decoded with an inverse Variable Length encoding scheme in decoding unit 1002b before being reordered in the inverse reordering unit 1102. In another embodiment, the coefficients are sent to the decoding unit 1002b only when the codec is operating in a CABAC mode. Alternatively when the codec is operating in a CAVLC mode, the coefficients may by-pass the decoding unit 1002b and are transmitted to the inverse ordering unit 1102 directly (Not shown). This is done when the lossless decompression of the coefficients has been completed in the entropy module 208 before being stored in memory and processed by the transformation module. Other entropy decoding decompression schemes may also be applicable. Similarly, decoding unit 1002c performs entropy decoding on the parameters using any known entropy decoding mappings.

Figure 11B:
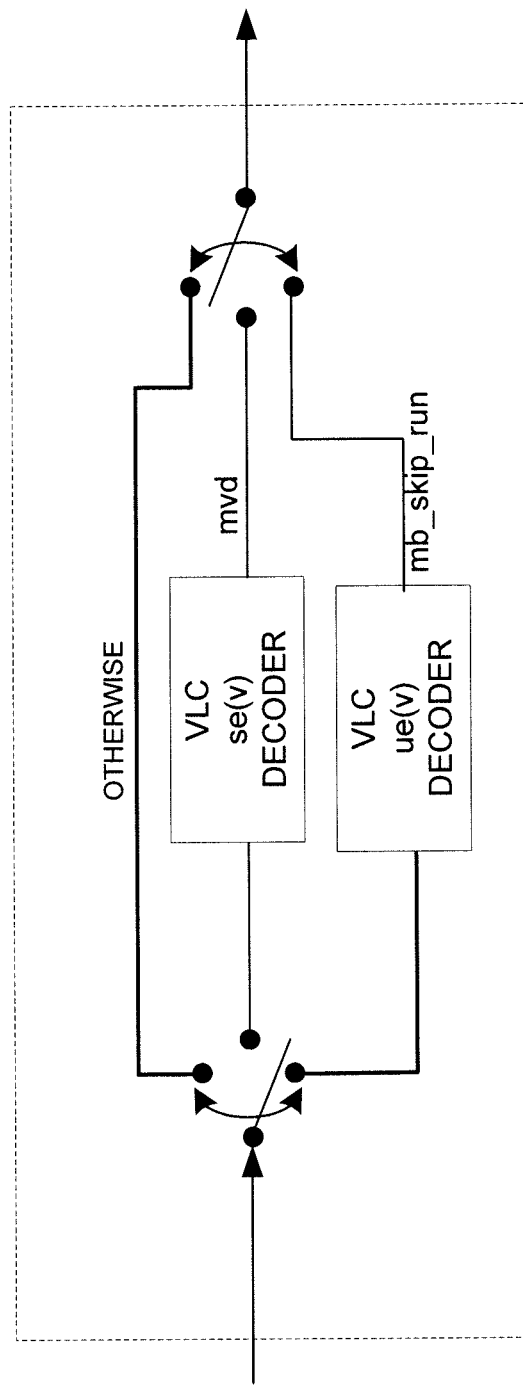
FIG. 11b is an exemplary illustration of data flow through a decoding unit from the transformation module in accordance with CAVLC.

FIG. 11b illustrates an exemplary embodiment for the flow of data in decoding unit 1002c in accordance with a CAVLC decoding mode (entropy decoding mode flag=0). Parameters may be sorted such that a "ue" decoding type is performed to retrieve the syntax element "mb_skip_run". An "se" decoding type is performed to retrieve the syntax element "mvd". All other parameters are sent straight through to the output without further decoding.

Figure 11C:
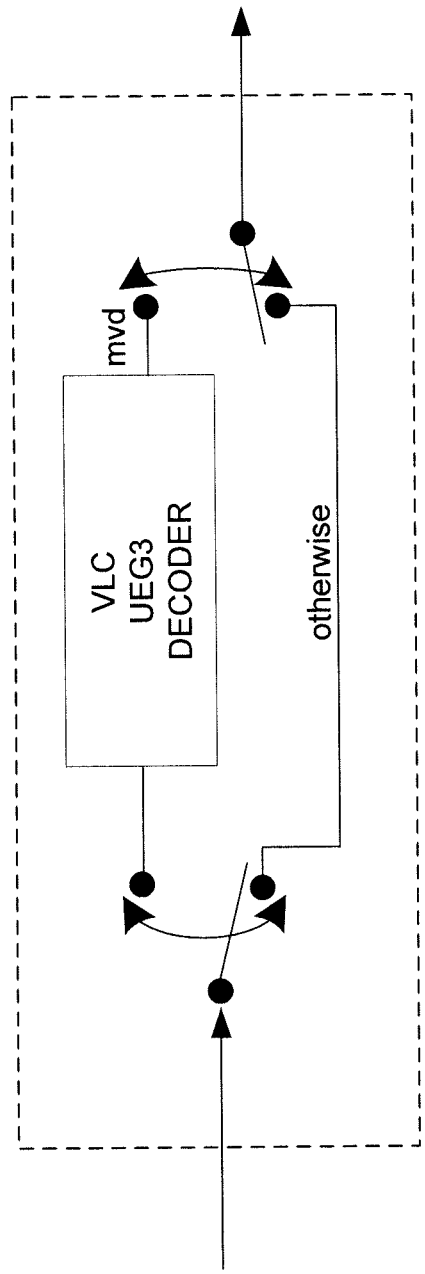
FIG. 11c is an exemplary illustration of data flow through the decoding unit from the transformation module in accordance with a CABAC mode.

FIG. 11c illustrates an exemplary embodiment for the flow of data in decoding unit 1002c in accordance with a CABAC decoding mode (entropy decoding mode flag=1). A first set of parameters is decoded according to at least one Variable Length decoding scheme. For example, the motion vector difference "mvd" may be decoded using "UEG 3", while all other parameters are sent straight through to the output without further decoding.

According to some embodiments, the different modules present in codec 102 may be duplicated in order to speed up the processing of data and provide better performances to the codec 102 when implemented in a chip. For example, the codec 102 may comprise many instances of the entropy module 208, and/or many instances of the transformation module 204 and the prediction module 202. According to other embodiments, the entropy module 208 of the codec 102 may comprise a plurality of sub-modules, each module performing a compression or decompression type. For example, the entropy module 208 may comprise a CABAC encode module and a CABAC decode module, a CAVLC encode module and a CAVL decode module. In another example, the entropy module 208 includes a plurality of instances of the CABAC decode module, a CAVLC encode module, a CAVLC decode module along with a CABAC encode module. In general the entropy module 208 may comprise a plurality of the same sub-module and other sub-modules.

According to some embodiments, the control module 200 may configure all the different modules of the codec 102 at receipt of a compression or decompression request from an external application. The control module 200 thus configures the prediction module 202, the transformation module 204, the in-loop filter module 206 and/or the entropy module 208 simultaneously upon receipt of the compression or decompression request from an application. Different modules may be configured according to the type of request made (compression or decompression). In other embodiments, the control module 200 configures a module only once the previous module has finished processing a picture or a portion of the picture.

In some embodiments, the codec 102 may be configured to process a plurality of independent streams simultaneously. For example, the prediction module 202 may be configured to process a first group of macroblocks of a first stream while the transformation module 204 is configured to process a first group of macroblocks of a second stream. At any given time, the processing occurring in a module is independent from the processing of the other modules. Consequently the task and the data processed in the different modules are independent. For example, a prediction module 202 can be configured to perform the compression steps of a first group of macroblocks while the entropy module 208 is performing decompression tasks of a second stream.

In some of the embodiments described above, the modules included in the codec 102 are described as register-based engines. The register-based engines may be double or multi-buffered. In other embodiments, one or more of the modules may be implemented as command-based engines receiving commands and data and performing the tasks as described above.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. Furthermore, the data paths may be communication paths, communication links, data buses, and any other type of connection allow the transfer of data. For example, in some embodiments, a data path may represent a plurality of communication buses. The data paths may be bi-directional or uni-directional and may carry instructions, commands, handshake signals, requests and/or control information. Additional data paths to those shown in the figures may also be provided between the various components of the system 100. The structure illustrated is thus provided for efficiency of teaching the present embodiment.

It should be noted that the present invention can be carried out as a method and can be embodied in a system or on a computer readable medium. The embodiments of the invention described above are intended to be exemplary only. The scope of the invention is therefore intended to be limited solely by the scope of the appended claims.

The invention claimed is:

1. A method for compressing a data stream with a compression device comprising at least a first module and a second module, the method comprising:
   processing the data stream using a lossy compression scheme to generate a set of reconstruction parameters and transform coefficients;
   reordering the transform coefficients in the first module;
   applying a first set of lossless encoding schemes to a first portion of the reconstruction parameters and the transform coefficients in the first module;
   selecting, in the first module, which ones of the reconstruction parameters and the transform coefficients will form part of a compressed bit stream and writing to memory selected ones of the reconstruction parameters and transform coefficients;
   retrieving from memory the selected ones of the reconstruction parameters and transform coefficients by the second module;
   applying a second set of lossless encoding schemes to a second portion of the reconstruction parameters and transform coefficients in the second module; and
   generating the compressed bit stream.

2. The method of claim 1, wherein applying a second set of lossless encoding schemes comprises applying arithmetic coding to the second portion of the reconstruction parameters and transform coefficients.

3. The method of claim 1, wherein applying a first set of lossless encoding schemes comprises encoding the transform coefficients with a variable length encoding scheme.

4. The method of claim 3, wherein the variable length encoding scheme is defined according to a context-adaptive binary arithmetic coding (CABAC) compression scheme.

5. The method of claim 3, wherein applying a second set of lossless encoding schemes comprises inversing the variable length encoding performed on the transform coefficients.

6. The method of claim 5, wherein inversing the variable length encoding scheme on the transform coefficients is defined according to a CABAC decompression scheme.

7. The method of claim 5, wherein applying a second set of lossless encoding schemes comprises performing context-adaptive variable length coding (CAVLC) on the transform coefficients.

8. The method of claim 2, wherein the arithmetic coding is part of CABAC.

9. A compression device for compressing a data stream comprising:
   at least a first module configured for:
      processing the data stream using a lossy compression scheme to generate a set of reconstruction parameters and transform coefficients;
      reordering the transform coefficients;
      applying a first set of lossless encoding schemes to a first portion of the reconstruction parameters and the transform coefficients;
      selecting which ones of the reconstruction parameters and the transform coefficients will form part of a compressed bit stream and writing to memory selected ones of the reconstruction parameters and transform coefficients; and
   a second module separate from the first module and configured for:
      retrieving from the memory the selected ones of the reconstruction parameters and transform coefficients;
      applying a second set of lossless encoding schemes to a second portion of the reconstruction parameters and transform coefficients; and
      generating the compressed bit stream.

10. The compression device of claim 9, wherein the at least first module comprises a transformation module adapted to generate for each one of the macroblocks a prediction and mode selection, generate a set of residuals using the prediction, and transform and quantize the residuals to obtain the transform coefficients.

11. The compression device of claim 9, wherein applying a second set of lossless encoding schemes comprises applying arithmetic coding to the second portion of the reconstruction parameters and transform coefficients.

12. The compression device of claim 9, wherein applying a first set of lossless encoding schemes comprises encoding the transform coefficients with a variable length encoding scheme.

13. The compression device of claim 12, wherein the variable length encoding scheme is defined according to a context-adaptive binary arithmetic coding (CABAC) compression scheme.

14. The compression device of claim 12, wherein applying a second set of lossless encoding schemes comprises inversing the variable length encoding performed on the transform coefficients.

15. The compression device of claim 14, wherein inversing the variable length encoding scheme on the transform coefficients is defined according to a CABAC decompression scheme.

16. The compression device of claim 14, wherein applying a second set of lossless encoding schemes comprises performing context-adaptive variable length coding (CAVLC) on the transform coefficients.

17. The compression device of claim 11, wherein the arithmetic coding is part of CABAC.

18. A method for decompressing a data stream with a decompression device comprising at least a first module and a second module, the method comprising:
  receiving a compressed bit stream in the first module;
  applying a first set of lossless decoding schemes to the compressed bit stream in the first module to produce a first set of reconstruction parameters and transform coefficients;
  writing to memory the first set of reconstruction parameters and transform coefficients and a remaining portion of the compressed bit stream;
  retrieving from memory the first set of reconstruction parameters and transform coefficients and the remaining portion of the compressed bit stream by the second module;
  applying a second set of lossless decoding schemes to the bit stream to recover a second set of reconstruction parameters and transform coefficients in the second module; and
  processing the data stream using a lossy decompression scheme to recover the data stream as decompressed.

19. A decompression device for decompressing a data stream comprising:
  a first module configured for:
    receiving a compressed bit stream;
    applying a first set of lossless decoding schemes to the compressed bit stream to produce a first set of reconstruction parameters and transform coefficients;
    writing to memory the first set of reconstruction parameters and transform coefficients and a remaining portion of the compressed bit stream; and
  at least a second module configured for:
    retrieving from memory the first set of reconstruction parameters and transform coefficients and the remaining portion of the compressed bit stream;
    applying a second set of lossless decoding schemes to the bit stream to recover a second set of reconstruction parameters and transform coefficients; and
    processing the data stream using a lossy decompression scheme to recover the data stream as decompressed.

* * * * *